(12) United States Patent
Sato

(10) Patent No.: US 6,343,187 B1
(45) Date of Patent: Jan. 29, 2002

(54) CAMERA WITH BLUR REDUCING FUNCTION

(75) Inventor: Tatsuya Sato, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/557,984

(22) Filed: Apr. 25, 2000

(30) Foreign Application Priority Data

Apr. 26, 1999 (JP) .................................. 11-118019

(51) Int. Cl.⁷ .............................. G03B 17/40
(52) U.S. Cl. ............................ 396/52; 396/53
(58) Field of Search ................ 396/52–55, 263, 396/266

(56) References Cited

U.S. PATENT DOCUMENTS

| 5,307,113 A | * | 4/1994 | Egawa | 396/54 |
| 5,576,788 A | * | 11/1996 | Miyazawa et al. | 396/52 |
| 5,708,863 A | | 1/1998 | Satoh et al. | 396/52 |
| 5,790,490 A | | 8/1998 | Satoh et al. | 396/52 |

FOREIGN PATENT DOCUMENTS

JP 5-204012 8/1993

* cited by examiner

Primary Examiner—W. B. Perkey
(74) Attorney, Agent, or Firm—Frishauf, Holtz, Goodman, Langer & Chick, P.C.

(57) ABSTRACT

An exposure start determining section executes exposure start determination for reducing a shake level, on the basis of the output of a shake detecting/computing section, and a reduction in shaking is waited for. An exposure start determination controlling section determines the wait time, i.e. a time lag, and a state reporting section reports information corresponding to the stages of the time lag.

13 Claims, 18 Drawing Sheets

CAMERA WITH BLUR REDUCING FUNCTION

CROSS-REFERENCE TO RELATED APPLICATIONS

This application is based upon and claims the benefit of priority from the prior Japanese Patent Application No. 11-118019, filed Apr. 26, 1999, the entire contents of which are incorporated herein by reference.

BACKGROUND OF THE INVENTION

This invention relates to a camera with a blur reducing function, which can start a photographing operation (a film exposure operation in the case of a camera using a film, and an imaging operation in the case of a digital camera) at a time point at which the camera is not greatly shook by hand, and more particularly to a method for reporting the operation timing information of the camera.

There are, so far, lots of proposals for a camera with a blur reducing function, which is adapted to start its exposure operation at a time point at which the camera is not greatly shook by hand.

For example, U.S. Pat. No. 5,790,490 proposes a device for preventing camera blur wherein the level of hand-shake of the camera is detected, and exposure is started when it is determined that the level of shaking is lower than a predetermined value, i.e. that the shake level of the camera is sufficiently reduced, thereby preventing (reducing) blurring from occurring in a photograph.

Although the proposed technique enables reduction of blurring in a photograph, a long time lag will occur when the camera has been greatly shook, since exposure cannot be started unless the level of shaking is sufficiently low. This may cause the photographer to erroneously recognize that the camera is out of order. To avoid this, U.S. Pat. No. 5,708,863 proposes to set a limit on time lag. When the time lag exceeds a limit value, exposure is forcibly started irrespective of the level of shaking.

However, where a method as disclosed in U.S. Pat. No. 5,708,863 is employed, the photographer does not know whether the camera has started exposure because the level of hand-shake is reduced, or because the time lag has exceeded a limit value, i.e. whether exposure has been started irrespective of the level of shaking. In the former case, it is highly possible that the degree of blurring in a photograph is low, and hence no problem occurs. In the latter case, however, it is possible that the degree of blurring is high. Therefore, the photographer cannot be sure of the quality of a resultant photograph.

BRIEF SUMMARY OF THE INVENTION

The present invention has been developed in light of the above, and aims to provide a camera with a blur reducing function, which can provide information as to whether or not exposure has been started after the level of shaking has sufficiently decreased.

According to a first aspect of the present invention, there is provided a camera with a blur reducing function comprising:
   sampling means responsive to a releasing operation for sampling levels of shaking of the camera in a time-series manner;
   control means for starting exposure when shake data sampled by the sampling means satisfies a predetermined determination criterion or when a period having elapsed from the releasing operation has reached a predetermined period; and
   display means for displaying information concerning conditions assumed at least till start of exposure.

According to a second aspect of the present invention, there is provided a camera with a blur reducing function comprising:
   a shake detecting/computing section for detecting and computing a shaking state of the camera;
   a photography start determining section for executing photography start determination on the basis of an output of the shake detecting/computing section so as to reduce shaking during photography;
   a shutter unit operable in response to a determination result of the photography start determining section, thereby enabling photography;
   a time measuring section for measuring a period for which the photography start determination is continued by the photography start determining section; and
   a reporting section for reporting time lag information in stages on the basis of a measurement result of the time measuring section.

According to a third aspect of the present invention, there is provided a camera comprising:
   a sensor for continuously sensing a shake state of the camera;
   a release switch for instructing the camera to execute a photography operation;
   a shutter unit;
   a control circuit for operating the shutter unit so as to execute photography when the release switch has been depressed and after an output of the sensor is lower than a predetermined value; and
   a monitor for displaying information indicating stages of a wait period for which the control circuit was waiting for the output of the sensor to become lower than the predetermined value.

According to a fourth aspect of the present invention, there is provided a method of reducing, during exposure, shaking of a camera having a sensor for sensing a shake state of the camera, and a monitor for displaying information on shaking, comprising:
   a first step of sampling shake data in a time-series manner on the basis of an output of the sensor;
   a second step of measuring a period required for a level of shaking to be lower than a reference value, on the basis of a predetermined number of shake data items sampled by the sensor in a time-series manner;
   a third step of displaying, on the monitor, information corresponding to the period;
   a fourth step of forcibly executing exposure when the period is longer than a predetermined value; and
   a fifth step of displaying on the monitor, after exposure is executed forcibly, information indicating the execution of forced exposure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 18 is a graph illustrating the relationship between the time and the X- and Y-directional shake angular velocities, and useful in explaining the exposure start determination operation A in FIG. 17.

DETAILED DESCRIPTION OF THE INVENTION

An embodiment of the invention will be described with reference to the accompanying drawings.

Figure 1:
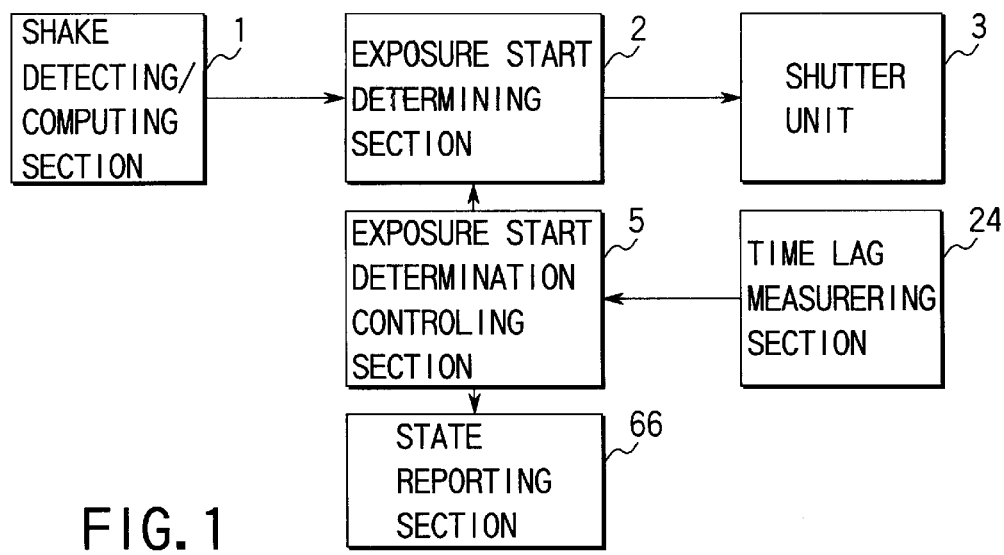
FIG. 1 is a block diagram illustrating a camera with a blur reducing function according to the embodiment of the invention.

FIG. 1 is a block diagram illustrating the concept of a camera with a blur reducing function according to the embodiment of the invention. This embodiment employs a camera using a film.

A shake detecting/computing section 1 executes detection and computation of hand-shake levels. Actually, the shake detecting/computing section 1 includes a pair of shake detecting/computing elements corresponding to the X-axis and the Y-axis of a photography screen. An exposure start determining section 2 determines whether the present level of shaking is high or low, on the basis of the output (i.e. the output level of hand-shake) of the shake detecting/ computing section 1, thereby allowing the start of exposure when the level of shaking is low. A shutter unit 3 operates and executes exposure in accordance with a determination result obtained from the exposure start determining section 2. An exposure start determination controlling section 5 controls an exposure start determining operation executed by the exposure start determining section 2. A time lag measuring section 24 measures a period (a time lag) which has elapsed after the exposure start determining section 2 has executed exposure start determination for starting the operation of the shutter unit 3. This time information is sent to the exposure start determination controlling section 5. A state reporting section 66 is responsive to the time measurement result of the time lag measuring section 24 for reporting time lag information in stages.

The operation of the camera with the blur reducing function will be described briefly. Basically, the exposure start determining section 2 executes exposure start determination for reducing the level of shaking, on the basis of the output of the shake detecting/computing section 1, and a reduction in shake level is waited for. The wait time, i.e. the time lag, is determined by the exposure start determination controlling section 5, and state report indicative of the time lag is executed in stages by the state reporting section 66.

Figure 2:
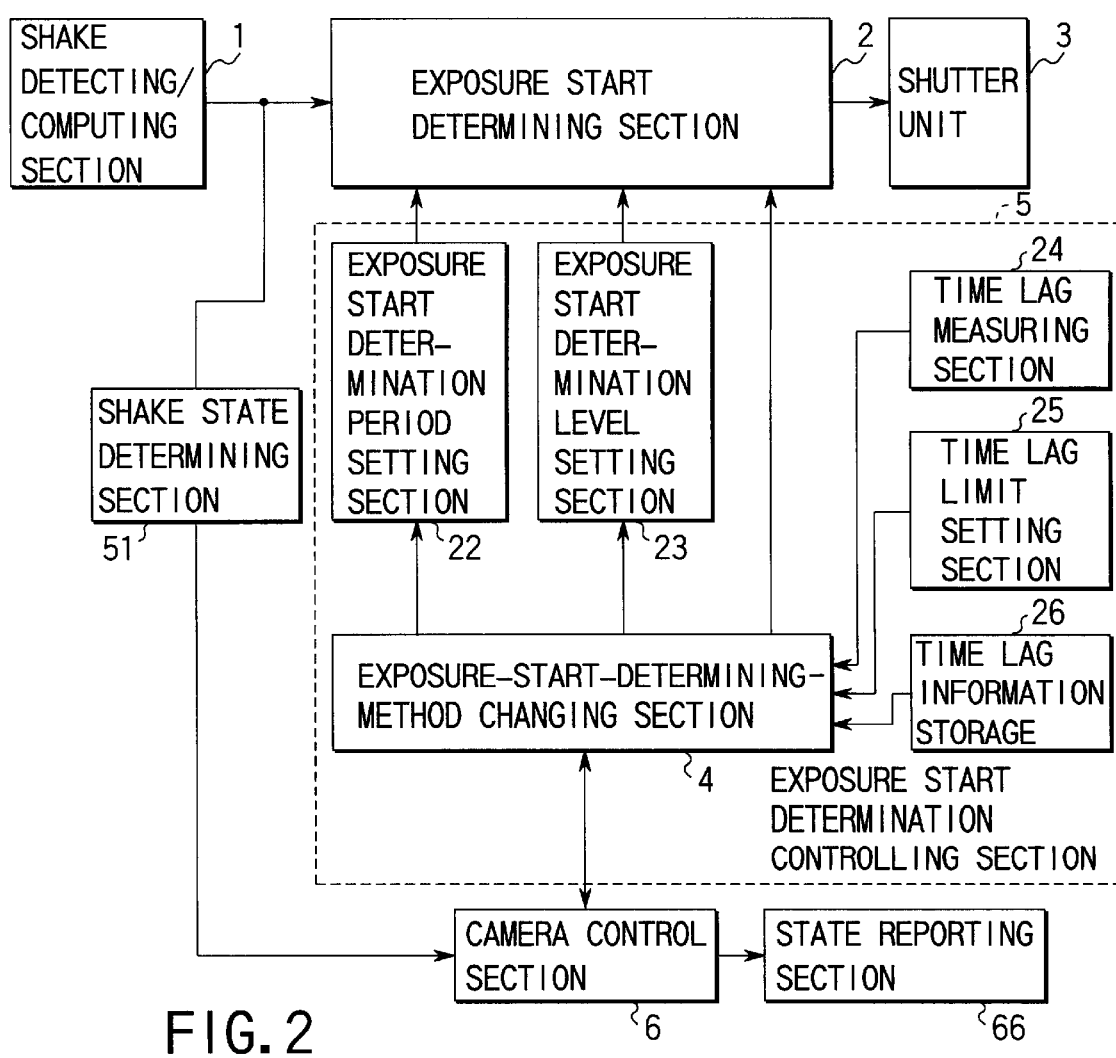
FIG. 2 is a block diagram illustrating the structure of the camera of FIG. 1 in more detail.

FIG. 2 is a block diagram illustrating the exposure start determination controlling section 5 in more detail.

The exposure start determination controlling section 5 includes an exposure-start-determining-method changing section 4, which is connected to an exposure start determination period setting section 22, an exposure start determination level setting section 23, a time lag limit setting section 25 and a time lag information storage 26. Further, as shown in FIG. 2, the time lag measuring section 24 may be incorporated in the exposure start determination controlling section 5.

The exposure-start-determining-method changing section 4 compares time information stored in the time lag information storage 26 with a time measurement result obtained from the time lag measuring section 24. In accordance with an elapsed time, the exposure-start-determining-method changing section 4 causes the state reporting section 66 to execute reporting in stages, and changes an exposure start determination method employed in the exposure start determining section 2. Specifically, the changing section 4 changes, for example, exposure start determination period information based on the output of the shake detecting/ computing section 1 and set in the exposure start determination period setting section 22, or changes determination level information set in the exposure start determination level setting section 23 for determination as to the output of the shake detecting/computing section 1.

When the time lag limit set in the time lag limit setting section 25 has expired, the exposure start determining section 2 starts exposure irrespective of the output level of the shake detecting/computing section 1, while a camera control section 6 causes the state reporting section 66 to execute reporting of the exposure operation after the exposure operation. The camera control section 6 causes the state reporting section 66 to report that exposure has been started forcibly since the time lag limit has expired. The control section 6 also causes a shake level determining section 51, which processes the output of the shake detecting/computing section 1, to determine the level of shaking during exposure, thereby reporting it through the state reporting section 66.

Figure 3:
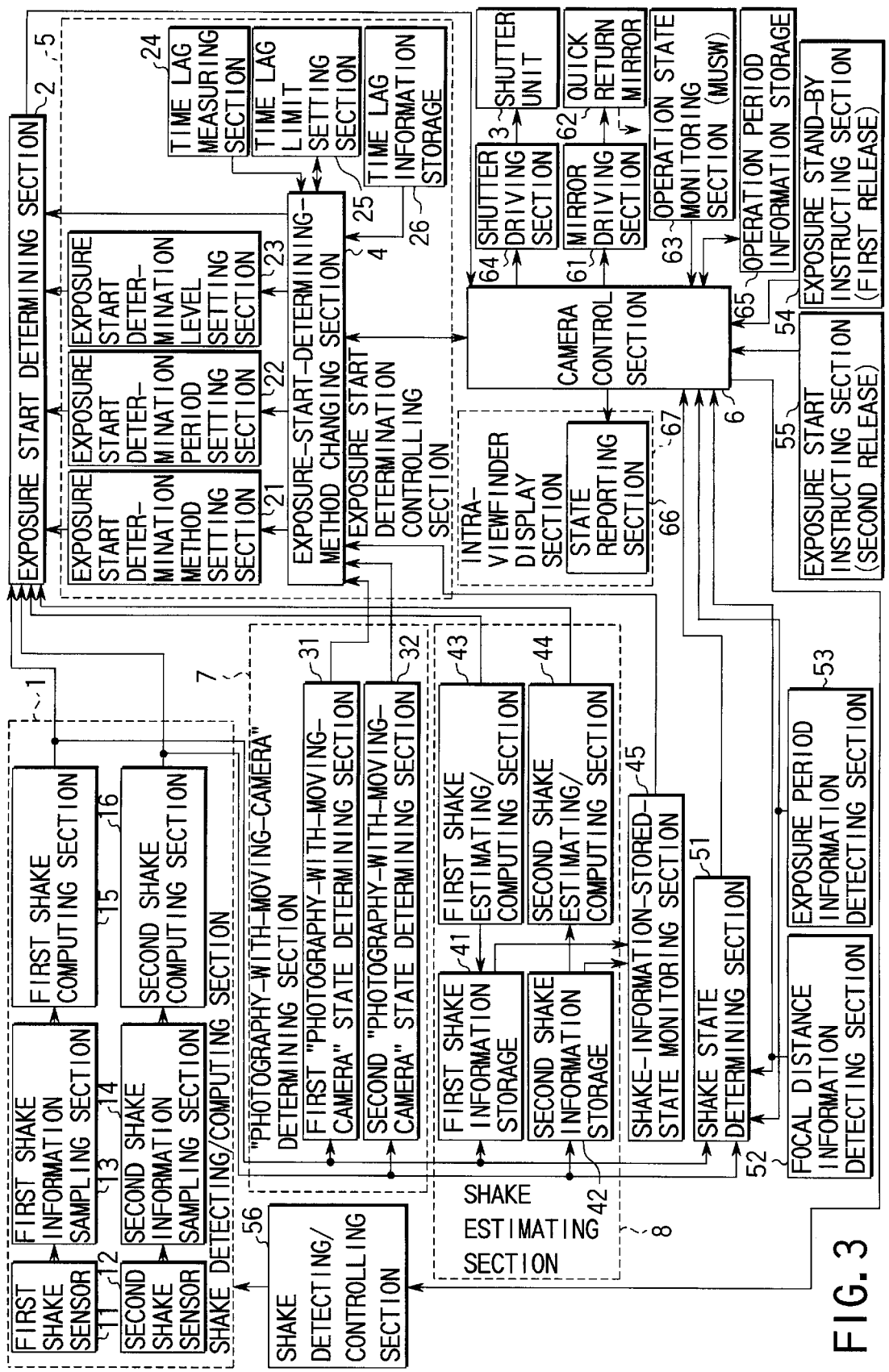
FIG. 3 is a block diagram illustrating an essential part of a single-lens reflex camera to which the camera with the blur reducing function according to the embodiment is applied.

FIG. 3 a block diagram illustrating an essential part of a single-lens reflex camera to which the camera with the blur reducing function according to the embodiment is applied.

The shake detecting/computing section 1 includes a first shake sensor 11, a second shake sensor 12, a first shake information sampling section 13, a second shake information sampling section 14, a first shake computing section 15 and a second shake computing section 16. The words "first" and "second" correspond to the X-axis and the Y-axis, respectively.

The first and second shake sensors 11 and 12 are formed of, for example, a known oscillation gyroscope (an angular velocity sensor). The first and second shake information sampling sections 13 and 14 are formed of an A/D conversion input port incorporated in a CPU. Further, each element located downstream of the first and second shake information sampling sections 13 and 14, which will be described later, is realized by the CPU, except for a storage formed of, for example, an EEPROM.

The first and second shake computing sections 15 and 16 execute, for example, a filtering operation on sampled data concerning shaking for eliminating any unnecessary frequency component. The outputs of the two shake computing sections 15 and 16 are sent to the exposure start determining section 2, a "photography-with-moving-camera" determining section 7 for determining whether or not photography is being executed while moving the camera, a shake estimating section 8 and a shake state determining section 51.

Figure 4:
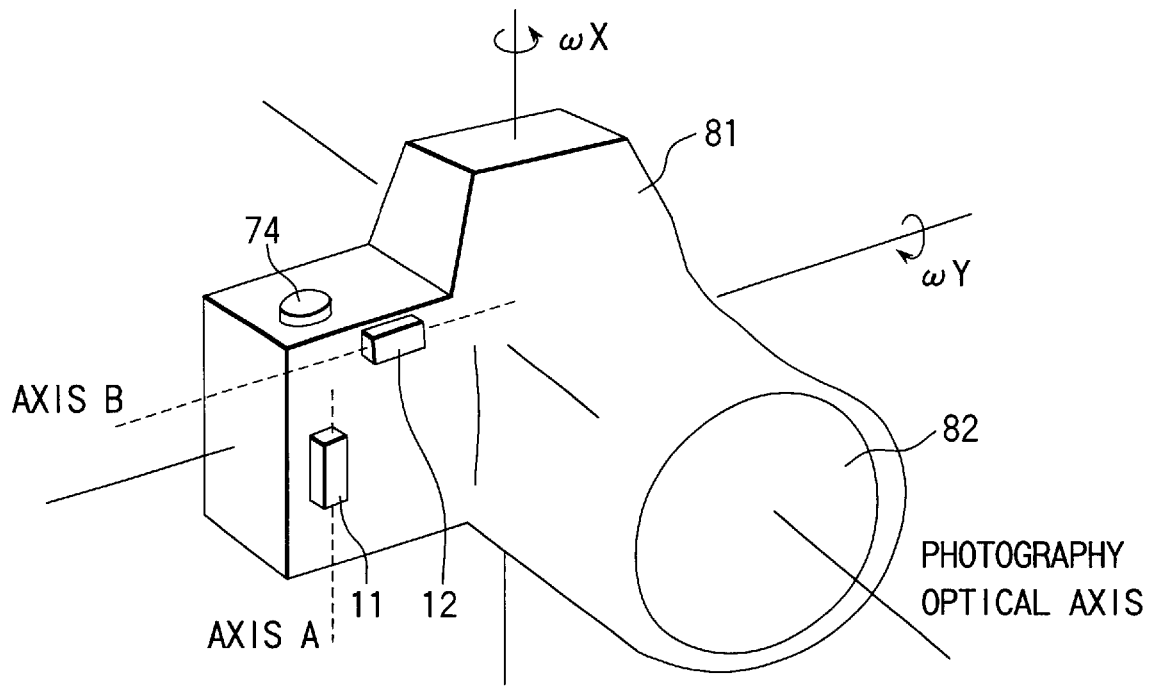
FIG. 4 is a perspective view useful in explaining the mounting positions of first and second shake sensors on a camera body.

The first and second shake sensors 11 and 12 are provided in a camera body 81 as shown in FIG. 4. In FIG. 4, reference numeral 74 denotes a release button, and reference numeral 82 denotes a lens.

The "photography-with-moving-camera" determining section 7 determines whether or not photography is being executed while moving the camera, on the basis of the output of the shake detecting/computing section 1, and includes a first "photography-with-moving-camera" state determining section 31 and a second "photography-with-moving-camera" state determining section 32. The words "first" and "second" correspond to the X-axis and the Y-axis, respectively. The determination results of the sections 31 and 32 are sent to an exposure-start-determining-method changing section 4.

The shake estimating section 8 estimates the state of shaking on the basis of the output of the shake detecting/computing section 1. The section 8 includes a first shake information storage 41, a second shake information storage 42, a first shake estimating/computing section 43 and a second shake estimating/computing section 44. The words "first" and "second" correspond to the X-axis and the Y-axis, respectively. The first and second shake information storages 41 and 42 store past data concerning the state of shaking, which is used for operations in the first and second shake estimating/computing sections 43 and 44. The first and second shake estimating/computing sections 43 and 44 estimate the levels of shaking at a time point slightly after the present time point by operations based on present/past shake level data stored in the first and second shake information storages 41 and 42, respectively. Specifically, the shake estimating operation is executed by a method as disclosed in Japanese Patent Application KOKAI Publication No. 5-204012. This method will be described briefly. The following formula is used for the estimating operation:

$$BL(t+m)=Ka*BL(t)+Kb*BL(t-10)+Kc*BL(t-20)$$

where $BL(t+m)$ represents the level of shaking at a time point m[mSEC] after the present time point, $BL(t)$ the level of shaking at the present time point, $BL(t-10)$ the level of shaking at a time point 10[mSEC] before the present time point, and $BL(t-20)$ the level of shaking at a time point 20[mSEC] before the present time point. Ka, Kb and Kc represent coefficients for the estimating operation. From this operation, the level of shaking slightly after the present time point can be estimated on the basis of shake information concerning the present time point and the two earlier time points. The formula and the coefficients are common between the X-axis and the Y-axis.

The thus-obtained estimation results are sent to the exposure start determining section 2. A shake-information-stored-state monitoring section 45 checks whether the first and second shake information storages 41 and 42 each store a predetermined number (corresponding to a predetermined period) of shake level data items. The checking results are sent to the exposure-start-determining-method changing section 4, where the results are used as a basis for changing the exposure start determining method employed in the exposure start determining section 2.

The shake state determining section 51 calculates the present level of blurring in an image on the basis of shake level data from the shake detecting/computing section 1, focal distance information from a focal distance information detecting section 52, and exposure period information from an exposure period information detecting section 53. The calculation result is sent to the camera control section 6, and a state reporting section 66 incorporated in an intra-viewfinder display section 67 informs (displays) the present level of shaking.

The camera control section 6 controls the entire camera. FIG. 3 shows only elements relating to the present invention and none of the other elements.

The outputs of an exposure stand-by instructing section 54 (a first release) and an exposure start instructing section 55 (a second release) are input to the camera control section 6. When the two-stage release button 74 has been half depressed, the exposure stand-by instructing section 54 generates a first release signal. Upon receiving the first release signal, the camera control section 6 executes known photography preparation operations such as AE and AF operations, a lens protruding operation, etc. Simultaneously, the camera control section 6 supplies an instruction to the shake detecting/controlling section 56 to drive the shake detecting/computing section 1 in order to inform the level of generated shaking.

When the release button 74 has been wholly depressed, the exposure start instructing section 55 generates a second release signal. Upon receiving the second release signal, the camera control section 6 executes an operation for exposure. Specifically, in the case of a single-lens reflex camera, the mirror driving section 61 drives the quick return mirror 62 so that light guided thereto from the lens 82 can reach an imaging surface (film). The operation state monitoring section 63 is means for monitoring the operation state of the quick return mirror 62. In addition, a lens stop (not shown) is driven to a required stop value. When the mirror 62 and the lens stop have been shifted to respective predetermined states, a shutter driving section 64 drives the shutter unit 3. After a predetermined exposure period passes, exposure is finished, whereby the mirror 26 and the lens stop are returned to predetermined positions, and the film is wound. This is the termination of a series of exposure operations.

In the camera of this embodiment, the blur reducing function is executed at this time. Specifically, detection of shaking is started when the mirror has stopped its operation, thereby monitoring the level of shaking. If it is determined, using a predetermined algorithm, that the level of shaking has reduced, the shutter unit 3 is allowed to operate. The above-described series of operations will be referred to as "exposure start timing control". When the raising operation of the mirror 62 is completed, the camera shakes. If, at this time, the shake detection result is used without any correction, it is possible that the aforementioned shake estimating operation result will be adversely affected. This leads to reduction of the blur reducing effect. To avoid it, it is necessary to consider the timing for starting the shake detecting operation. The operation period information storage 65 stores information concerning this timing. The period information may consist of fixed values, and may be stored in a memory such as an EEPROM.

The above-mentioned exposure start timing control is executed by the exposure start determining section 2 and an exposure start determination controlling section 5. The exposure start determination controlling section 5 includes the exposure-start-determining-method changing section 4, as well as an exposure start determination method setting section 21, an exposure start determination period setting section 22 and an exposure start determination level setting section 23. The exposure start determining section 2 executes an exposure start determination basically on the basis of parameters set in these setting sections 21, 22 and 23.

Specifically, an algorithm (which will be described later in detail) for exposure start determination is set in the exposure start determination method setting section 21. Information concerning exposure start determination periods for the X-axis and the Y-axis included in the parameters for the exposure start determination is stored in the exposure start determination period setting section 22. If the determination period is set long, the frequency of generation of an exposure start allowing signal is high, whereas if the period is set short, the frequency is low. Information concerning a determination level (threshold) for determining the level of shaking, which is included in the parameters for the exposure start determination, is set in the exposure start determination level setting section 23. If the determination level is set high, the frequency of generation of the exposure start allowing signal is high, whereas if the level is set low, the frequency is low. These information items are set at required values.

In the exposure start timing control, it is basically considered that exposure is started when the level of shaking has become low. In this case, however, exposure cannot be started unless the shaking level becomes low. Accordingly, there may be a case where exposure can never be started, and the photographer misunderstands that the camera is erroneously operating. To avoid this, the exposure start timing control is generally stopped, irrespective of the shaking level, after a predetermined period elapses. Moreover, it is considered to execute the exposure start timing control so as to output the exposure start allowing signal before the above-described predetermined period has been reached, i.e. so as to shorten a delay period (a release time lag). Specifically, the parameter set in the exposure start determination period setting section 22 or the exposure start determination level setting section 23, and used in the exposure start determining section 2, is changed in accordance with a period having elapsed from the start of the exposure start timing control. Furthermore, the photographer can be warned by being informed, through the state reporting section 66 of the intra-viewfinder display section 67, of the fact that the exposure timing control is being executed for more than a predetermined period (this means that the level of shaking is not low).

To execute the above operations, the exposure start determination controlling section 5 also contains a time lag measuring section 24, a time lag limit setting section 25 and a time lag information storage 26. The time lag measuring section 24 measures a period for which the exposure start timing control is executed, i.e. a time lag which has occurred. The time lag limit setting section 25 sets information on a predetermined time at which the exposure start timing control should be finished. The time lag information storage 26 stores a predetermined period shorter than a time lag limit, which is used as a basis for changing information set in, for example, the exposure start determination period setting section 22 in accordance with the exposure start timing control period, or a basis for the informing operation of the state reporting section 66. The time lag measuring section 24, the time lag limit setting section 25 and the time lag information storage 26 are connected to the exposure-start-determining-method changing section 4. In the section 4, determination concerning time is executed.

Figure 5:
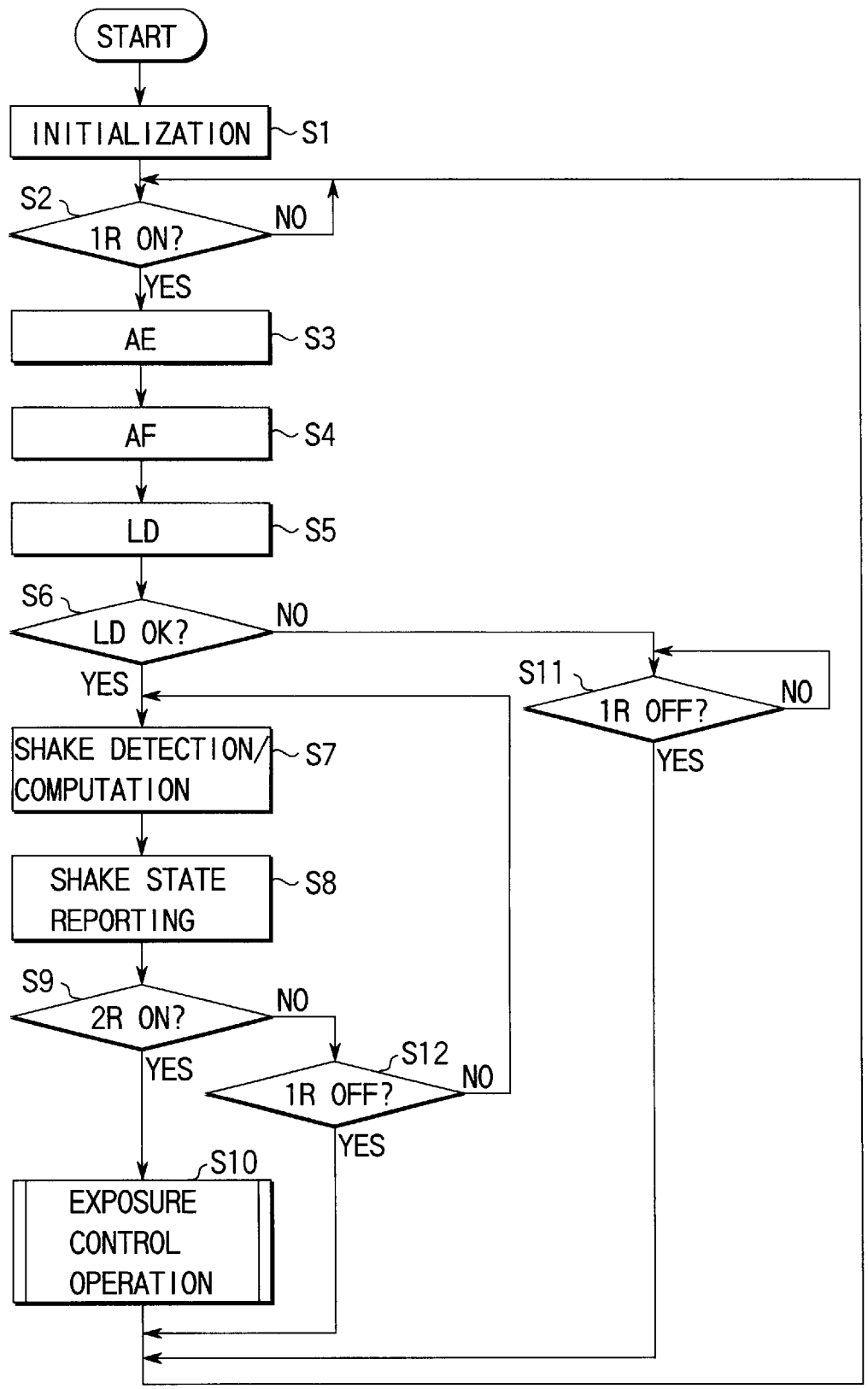
FIG. 5 is a flowchart useful in explaining the operation of the camera of FIG. 3.

FIG. 5 is a flowchart useful in explaining the camera constructed as above.

When a battery has been mounted in the camera or the power switch (not shown) of the camera has been turned on, and the camera has stated operating, the camera is first initialized (step S1), and is then shifted to a state in which it waits for the turn-on of a first release signal (1R) by the exposure stand-by instructing section 54 (step S2).

When the 1R has been turned on, the exposure period information detecting section 53 executes photometry (AE) (step S3) and the focal distance information detecting section 52 executes ranging (AF) (step S4). In accordance with focal distance information obtained by the AF, the lens 82 is driven (lens drive (LD))(step S5). It is determined at a step S6 whether the LD operation is executed appropriately (i.e. the LD operation is OK). If the LD operation is not OK, turn-off of the 1R is waited for (step S11), thereby returning to the step S2.

On the other hand, if the LD operation is determined to be OK, the shake detecting/computing section 1 executes detection and computation of shaking (step S7). Upon receiving the detecting/computing result, the shake state determining section 51 calculates the level of shaking, whereby the state reporting section 66 reports the calculated shake level (step S8).

Figure 6:
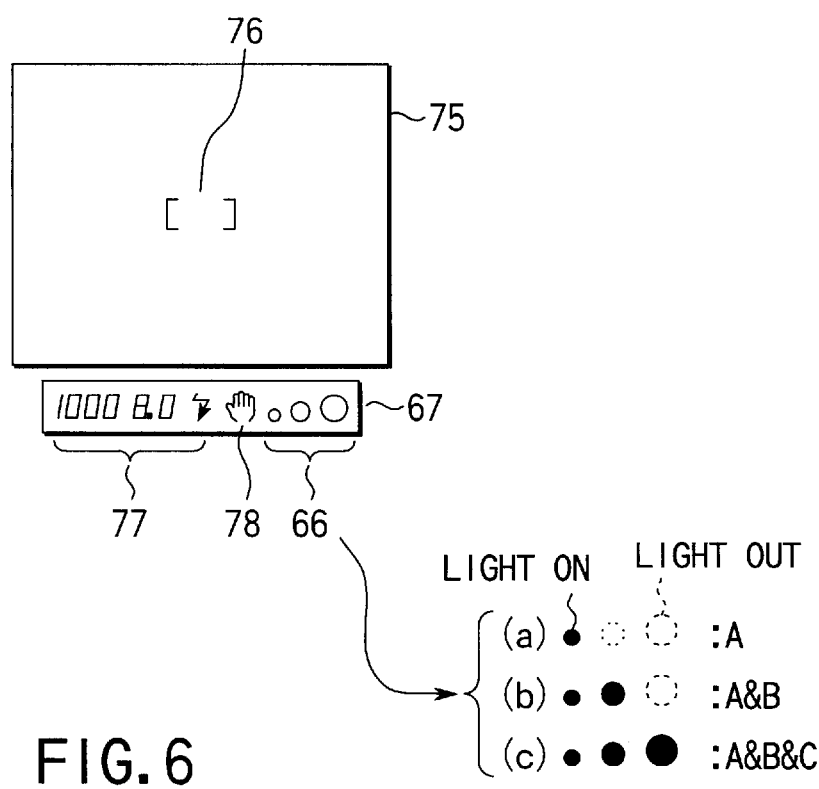
FIG. 6 is a view showing a display example of information on a shaking level.

Referring then to FIG. 6, a display example of the shaking level will be described. As shown, the intra-viewfinder display section 67 is provided below a viewfinder field frame 75 equipped with a guide 76 for indicating a ranging point. The intra-viewfinder display section 67 includes, as well as the state reporting section 66, a photography information display section 77 for displaying an exposure period, a stop value, etc., and a blur reducing mode display section 78 for displaying whether or not a blur reducing mode is set by blur reducing mode setting means (not shown). Means that can display the level of shaking in three stages may be used as the state reporting section 66. In this case, a lighting display denoted by (a) indicates shaking of a low level, a lighting display denoted by (b) indicates shaking of an intermediate level, and a lighting display denoted by (c) indicates shaking of a high level.

After informing the state of shaking as above, it is determined at a step S9 whether or not the exposure start instructing section 55 has turned on a second release signal (2R). If the 2R is in the OFF state, it is determined at a step S12 whether or not the 1R is in the OFF state. If the 1R is determined to be in the ON state, the program returns to the step S7, thereby repeating the shake detecting/computing processing and the shake informing processing. If, on the other hand, the 1R is determined to be in the OFF state, the program returns to the step S2.

If the 2R is turned on, exposure control operation as described later is performed (step S10). After finishing the exposure control operation, the program returns to the step S2.

Figure 7A:
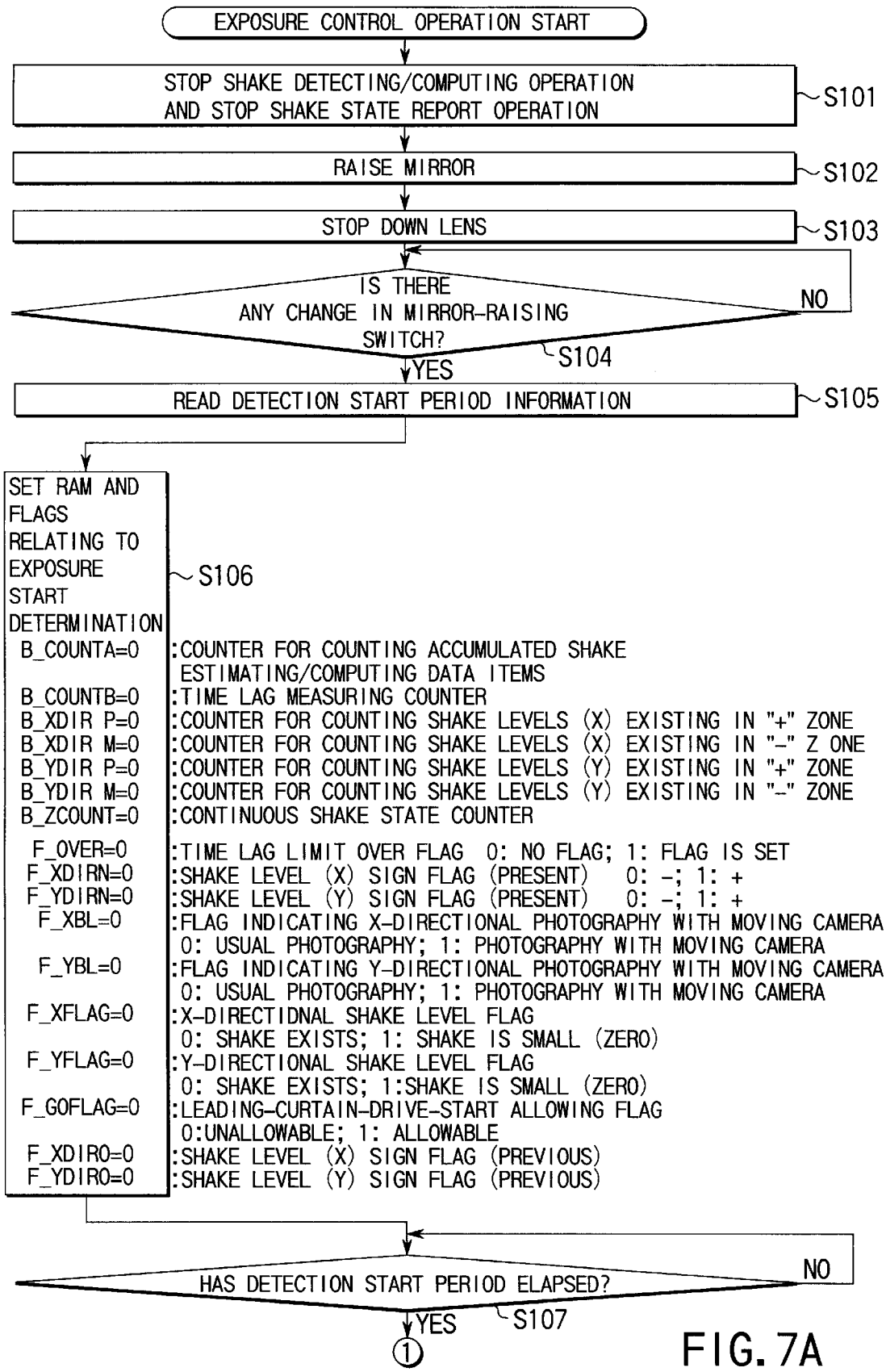
FIGS. 7A–7C are a series of flowcharts useful in explaining the exposure control operation in FIG. 5.
Figure 7B:
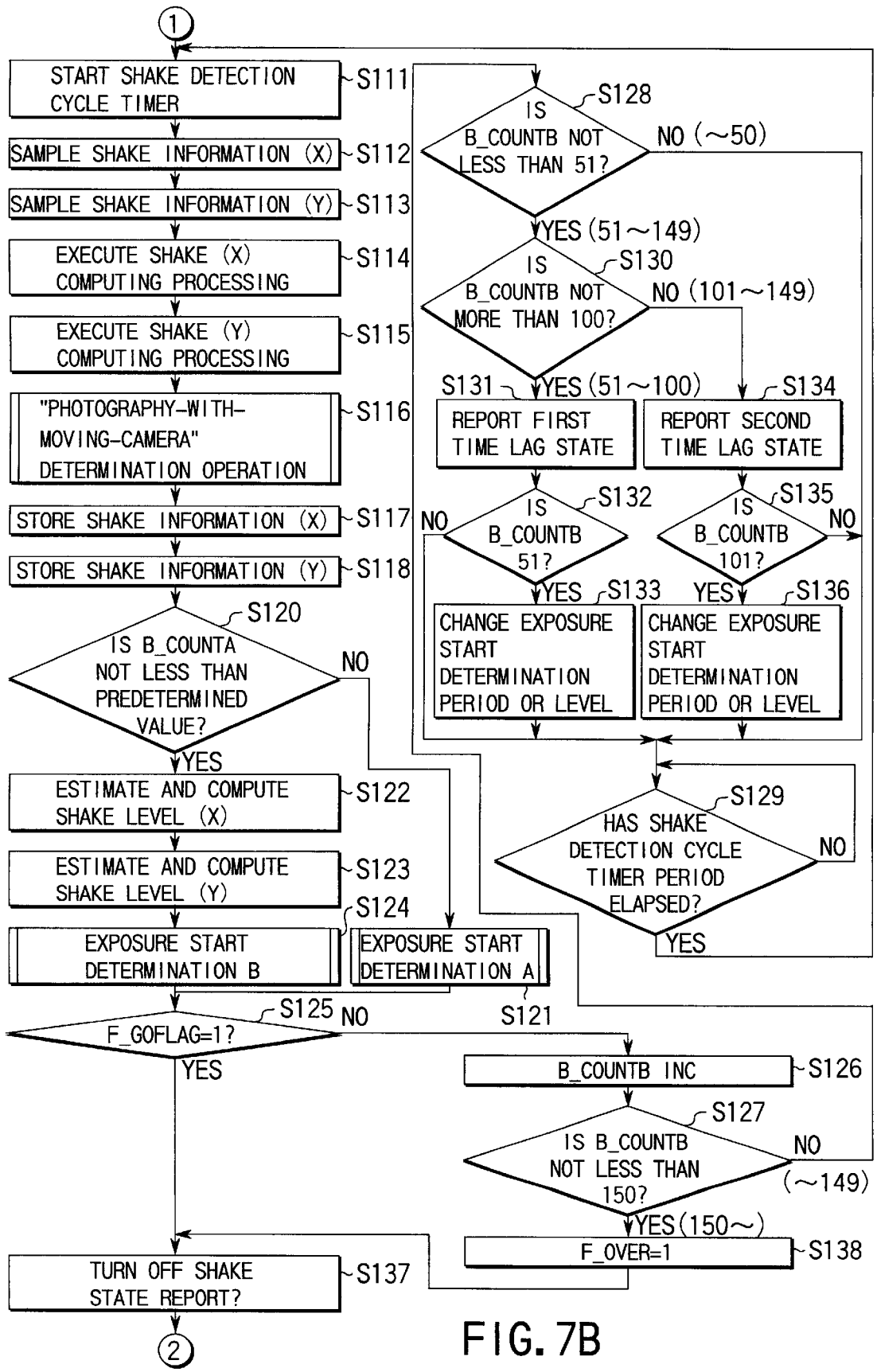
Figure 7C:
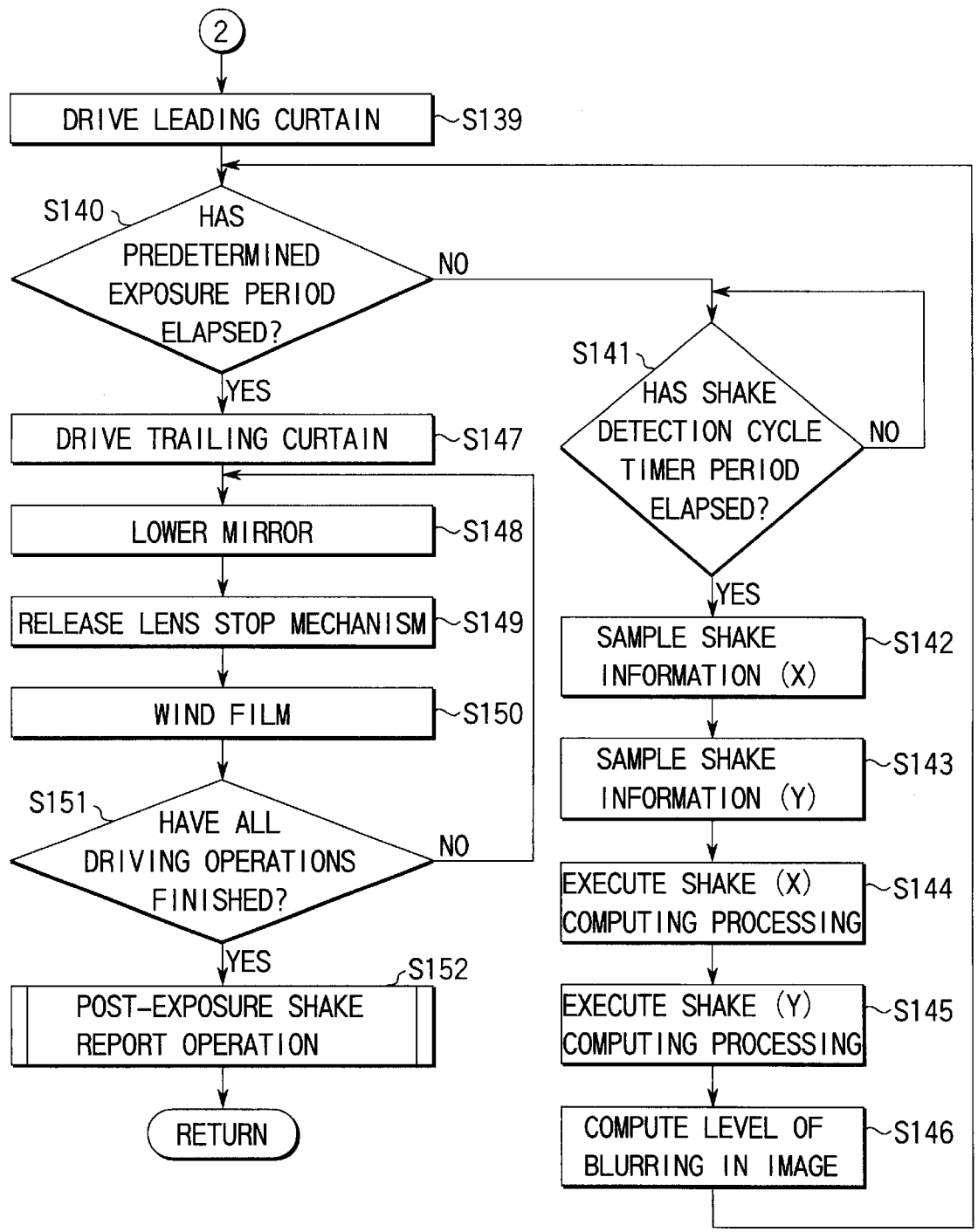

The "exposure control" operation at the step S10 is specifically carried out as indicated by a series of flowcharts of FIGS. 7A–7C.

First, the shake detecting/computing processing by the shake detecting/computing section 1 and the shaking-state informing processing by the state reporting section 66 are stopped simultaneously (step S101). Then, the quick return mirror 62 is raised by the mirror driving section 61 (step S102), and a lens stop mechanism (not shown) is driven to stop down the lens (step S103).

Subsequently, it is determined whether or not the state of the mirror-raising switch has changed (step S104). This determination is made on the basis of information output from the operation state monitoring section 63, and repeated until the state of the switch changes.

If there is a change in the state of the mirror-raising switch, timing information for starting the shake detecting processing is read from the operation period information storage 65 (step S105).

After that, RAM (counters) and flags (concerning the meanings of each counter and flag, see FIG. 7A), which are used in relation to exposure timing control described below, are cleared (initialized) (step S106).

It is determined at a step S107 whether or not a period equal to the period read at the step S105 has elapsed. This determination is repeated until the period elapses.

Figure 8:
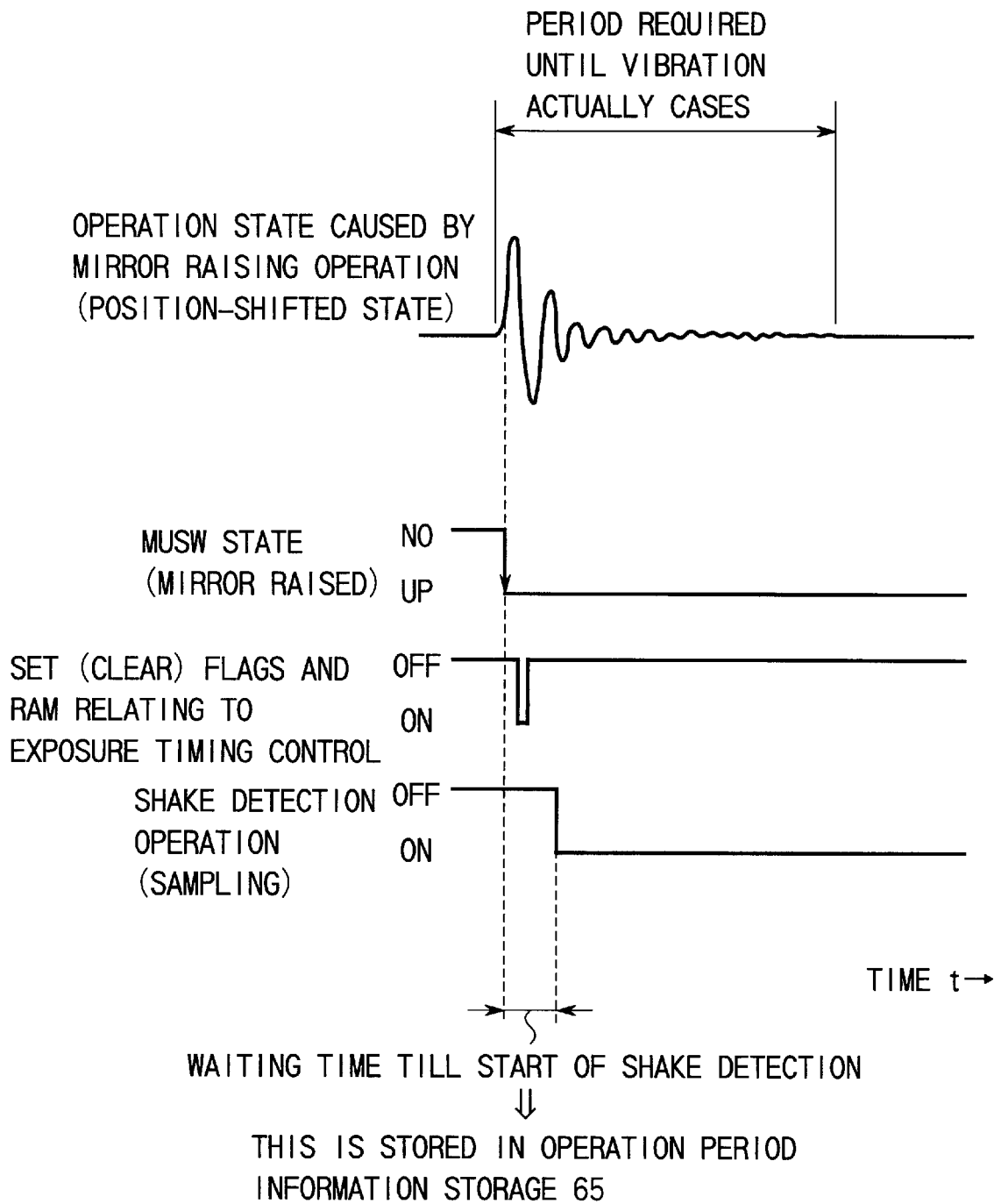
FIG. 8 is a timing chart useful in explaining a waiting period till the start of shake detection.

Referring then to the flowchart of FIG. 8, a description will be given of the above-mentioned waiting period. In FIG. 8, the top waveform indicates the state of shaking (changes in position) due to a mirror raising operation, the next waveform down indicates the state of the mirror-raising switch (corresponding to the output signal of the operation state monitoring section 63), the next waveform down indicates a time point at which the RAM and flags relating to the exposure timing control are cleared (at the step S106), and the bottom waveform indicates the ON/OFF states of the shake detecting operation (sampling operation). The abscissa indicates the time axis.

The period required until vibration caused by the mirror-raising operation actually stops is as long as several hundreds of milliseconds. If, however, shake detection (sampling) is started after the period elapses, a very long time lag occurs. To avoid this, shake detection is started after a period after which it is considered that no problem occurs in shake detecting processing, even when vibration has been generated because of the mirror-raising operation. This period is shorter than the period required until vibration caused by the mirror-raising operation actually ceases, and is stored in the operation period information storage 65.

If it is determined at the step S107 that the detection start time has been reached, a shake detection cycle timer is started (step S111). This enables sampling of shake information at regular cycles.

After that, shake information sampling corresponding to the x-axis of an imaging surface is executed by a first shake information sampling section 13 (step S112), while shake information sampling corresponding to the Y-axis of the imaging surface is executed by a second shake information sampling section 14 (step S113). Then, shake computing processing corresponding to the X-axis of an imaging surface is executed by a first shake computing section 15 (step S114), while shake computing processing corresponding to the Y-axis of the imaging surface is executed by a second shake computing section 16 (step S115). On the basis of shake information obtained by the shake computing sections 15 and 16, determination as to whether or not photography is being executed while moving the camera is executed by the "photography-with-moving-camera" determining section 7 (step S116). The method for "photography-with-moving-camera" determination will be described later.

Subsequently, the shake information corresponding to the X-axis of the imaging surface and obtained by the first shake computing section 15 is stored in a first shake information storage 41 (step S117). Similarly, the shake information corresponding to the Y-axis of the imaging surface and obtained by the second shake computing section 16 is stored in a second shake information storage 42 (step S118). Thereafter, the value of a counter B_COUNTA for counting the number of data items accumulated for shake estimation and computation (this counter constitutes a shake-information-stored-state monitoring section 45) is incremented (step S119). It is determined at the next step S120 whether or not the resultant value of the counter B_COUNTA is not less than a predetermined value. This enables determination as to whether or not each of the first and second shake information storages 41 and 42 stores not less than a predetermined number (i.e. not less than a predetermined period) of shake information items. If it is determined that the value of the counter is not less than the predetermined value, the program proceeds to a step S122, whereas if the value is less than the predetermined value, the program proceeds to a step S121.

This means that unless the predetermined number of shake information items are stored, exposure start determination cannot be executed using the shake estimation method. Therefore, if it is determined that the predetermined number of shake information items are not yet stored, the exposure start determining section 2 executes an exposure start determination operation A using the present shake information (step S121). The exposure start determination operation A will be described later in detail. If it is determined as a result of the exposure start determination operation A that exposure should be executed, a leading-curtain-drive-start start allowing flag F_GOFLAG is set at "1".

On the other hand, if the predetermined number (corresponding to the predetermined period) or more of shake information items are stored, exposure start determination using the shake estimation method is possible. In this case, shake estimation/computation corresponding to the X-axis of the imaging surface is executed by the first shake estimating/computing section 43 (step S122), and shake estimation/computation corresponding to the Y-axis of the imaging surface is executed by the second shake estimating/computing section 44 (step S123). After that, the exposure start determining section 2 executes an exposure start determination operation B using the shake estimation/computation results (step S124). The exposure start determination operation B will be described later in detail. If, also in the determination operation B, it is determined that exposure should be executed, the leading-curtain-drive-start start allowing flag F_GOFLAG is set at "1".

After the execution of the exposure start determination operations A and B, it is determined whether or not the leading-curtain-drive-start start allowing flag F_GOFLAG is set at "1" (step S125). If it is determined that the leading-curtain-drive-start start allowing flag F_GOFLAG is not "1", the value of a time lag counter B_COUNTB is incremented (step S126). Supposing that the cycle of processing from the step S111 to a step S136 described later is constant, this is equivalent to a case where time measurement is executed by the time lag measuring section 24.

After that, it is determined whether or not the value of the time lag counter B_COUNTB is not less than "150" (step S127). This means determination as to whether or not 300 milliseconds have elapsed from the start of the exposure start timing control, if the cycle of processing from the step S111 to the step S136 is, for example, 2 milliseconds. In this case, information concerning the time period is set in the time lag limit setting section 25.

If it is determined whether or not the value of the time lag counter B_COUNTB does not yet reach "150", it is further determined whether or not the value of the time lag counter B_COUNTB is not less than "51" (step S128). This means determination as to whether or not 100 milliseconds have elapsed from the start of the exposure start timing control, if the cycle of processing from the step S111 to the step S136 is, for example, 2 milliseconds. In this case, information concerning the time period is stored in the time lag information storage 26. If the stored period is not reached, i.e., if it is determined that the value of the time lag counter B_COUNTB does not yet reach "51", waiting processing is executed at a step S129 until a predetermined time period is measured by the shake detection cycle timer that is made to start a time measurement at the step S111. After the predetermined period elapses, the program returns to the step S111, thereby repeating the above-described sequential processing. The timer predetermined period is set at, for example, 2 milliseconds.

After the loop from the step S111 to the step S129 is repeated fifty times, it is determined in the 51st loop that the value of the time lag counter B_COUNTB is not less than "51". In this case, it is further determined at a step S130 whether or not the value of the time lag counter B_COUNTB is not less than "100". This means determination as to whether or not 200 milliseconds have elapsed from the start of the exposure start timing control, if the cycle of processing from the step S111 to the step S136 is, for example, 2 milliseconds. In this case, information concerning the time period is stored in the time lag information storage 26.

If it is determined that the elapsed period is less than 200 milliseconds, the program proceeds to a step S131, while if the elapsed period is not less than 200 milliseconds, the program proceeds to a step S134. Thus, if the period elapsed after the start of the exposure start timing control is between 102 milliseconds and 200 milliseconds, processes at steps S131–S133 are executed. On the other hand, if the period elapsed after the start of the exposure start timing control is not less than 200 milliseconds, processes at steps S134–S136 are executed.

Specifically, if it is determined that the value of the time lag counter B_COUNTB is not more than "100", at first, first time lag state informing is executed using the state reporting section 66 in the intra-viewfinder display section 67 (step S131). At this time, it is reported that 102 milliseconds or more have elapsed after the start of the exposure start timing control. For example, a single lighting display as indicated by (a) of FIG. 6 may be executed.

Subsequently, it is determined at a step S132 whether or not the value of the time lag counter B_COUNTB is "51". If the answer to the question at the step S132 is Yes, the program proceeds to a step S133, whereas if the answer is No, the program proceeds to the step S129. In other words, if the value of the time lag counter B_COUNTB is "51", the exposure start determining period is changed or the exposure start determining level is changed (step S133). More specifically, the determining period information set in the exposure start determination period setting section 22 is changed to a higher value, or the shake state determination level (threshold value) set in the exposure start determination level setting section 23 is changed to a higher value. This processing is executed on the assumption that even while the level of shaking is reduced by the exposure start timing control, the start of exposure can be easily allowed, thereby minimizing a possible time lag. After this changing processing, the program proceeds to the step S129.

After the above loop is repeated fifty times more, i.e. if the loop is the 101st one when it is counted from the beginning, it is determined at the step S130 that the value of the time lag counter B_COUNTB is not less than "100". In this case, second time lag informing is executed using the state reporting section 66 of the intra-viewfinder display section 67 (step S134). Specifically, the fact that 200 milliseconds or more have passed after the start of the exposure start timing control is reported. To inform this fact, it is considered to use two lighting displays as denoted by (b) of FIG. 6. The second time lag information indicates a stronger warning than the first time lag information issued at the step S131.

Subsequently, it is determined whether or not the value of the time lag counter B_COUNTB is "101" (step S135). If the answer is Yes, the program proceeds to a step S136, whereas if the answer is No, the program proceeds to the step S129. If the value of the time lag counter B_COUNTB is "101", the exposure start determining period is again changed or the exposure start determining level is again changed (step S136). More specifically, the determining period information set in the exposure start determination period setting section 22 is changed to a higher value (which is higher than the value set at the step S133), or the shake state determination level (threshold value) set in the exposure start determination level setting section 23 is changed to a higher value (which is higher than the value set at the step S133). This processing is executed on the assumption that even while the level of shaking is reduced by the exposure start timing control, the start of exposure can be allowed more easily than at the step S133, thereby further minimizing a possible time lag.

If it is determined at the step S125 that the leading-curtain-drive-start start allowing flag F_GOFLAG is "1", before the above loop is repeated 150 times, exposure is started. Accordingly, the information of the shaking level through the state reporting section 66 in the intra-viewfinder display section 67 at the step S131 or S134 is turned off (step S137).

On the other hand, if the leading-curtain-drive-start start allowing flag F_GOFLAG is not "1" even after the loop is repeated 150 times, it is determined that the exposure timing control should be finished, when it has been determined at the step S127 that the value of the time lag counter B_COUNTB has reached "150" or more, i.e. when the time lag limit has expired. In this case, a time lag limit over flag F_OVER is set at "1" (step S138), and then the program proceeds to the step S137.

After the shaking state information is stopped at the step S137, the leading-curtain-driving operation of the shutter unit 3 is started (step S139). In other words, exposure is started. At the next step S140, it is determined whether or not the period of exposure has reached a predetermined value detected by the exposure period information detecting section 53.

If it is determined that the predetermined exposure period is not yet reached, processing for detecting the level of shaking during exposure and informing it after exposure is executed. Specifically, at first, it is determined at a step S141 whether or not the shake detection cycle timer having started its operation at the step S111 has counted a predetermined period. If it is determined that the predetermined period has elapsed, the first shake information sampling section 13 executes shake information sampling in the direction of the imaging surface X-axis (step S142), and the second shake information sampling section 14 executes shake information sampling in the direction of the imaging surface Y-axis (step S143). Then, the first shake computing section 15 executes computation processing of X-axis directional shaking (step S144), while the second shake computing section 16 executes computation processing of Y-axis directional shaking (step S145). After that, the shake state determining section 51 calculates the level of blurring in an image on the basis of shake information obtained from the first and second shake computing sections 15 and 16 (step S146). Then, the program returns to the step S140. The level of blurring is obtained by, for example, integrating shake information items obtained during exposure from the first and second shake computing sections 15 and 16.

If it is determined at the step S140 that the predetermined exposure period has elapsed, the trailing-curtain-driving operation of the shutter unit 3 is started at a step S147. In other words, exposure is finished. At the next step S148, the mirror driving section 61 lowers the quick return mirror 62. Then, at a step S149, the lens stop mechanism (not shown) is released, and at a step S150, a film winding operation is executed by a film driving mechanism (not shown). It is determined at a step S151 whether or not a series of processing from the step S148 to the step S150 has been finished. If it is determined that the processing has been finished, post-exposure reporting of the state of shaking during exposure and the state of exposure start timing control (as to whether or not exposure is started, irrespective of the state of shaking, after the time lag limit has expired) is executed at a step S152. A detailed description will be given later of a method for post-exposure shake report operation. After that, the "exposure control" operation is finished, and the program returns to the main routine (RETURN).

Although "150", "51", "100", and "101" are set at the steps S127, S128 and S132, S130, and S135, the invention is not limited to these values (periods), but any other appropriate values may be set at the steps. It suffices if a common basic idea is employed between the cases.

A method for "photography-with-moving-camera" determination operation will now be described.

Figure 9A:
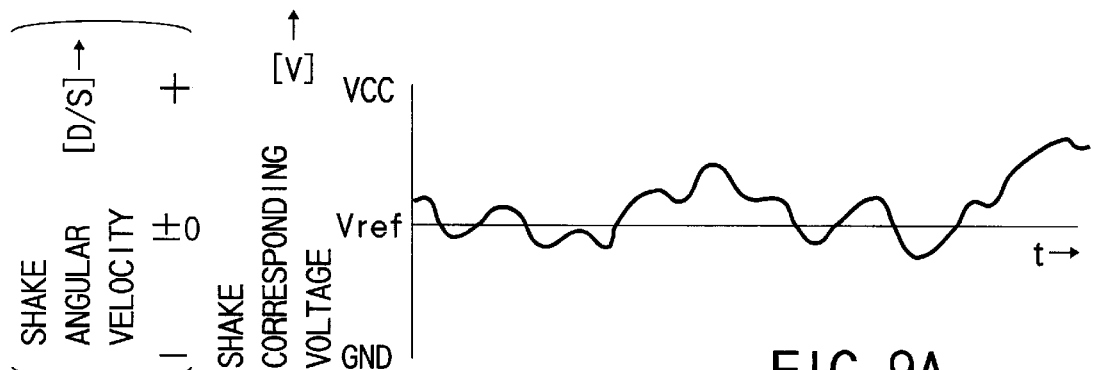
FIG. 9A is a graph showing a shake detection result (a waveform) obtained by usual photography executed with a camera held by hand.
Figure 9B:
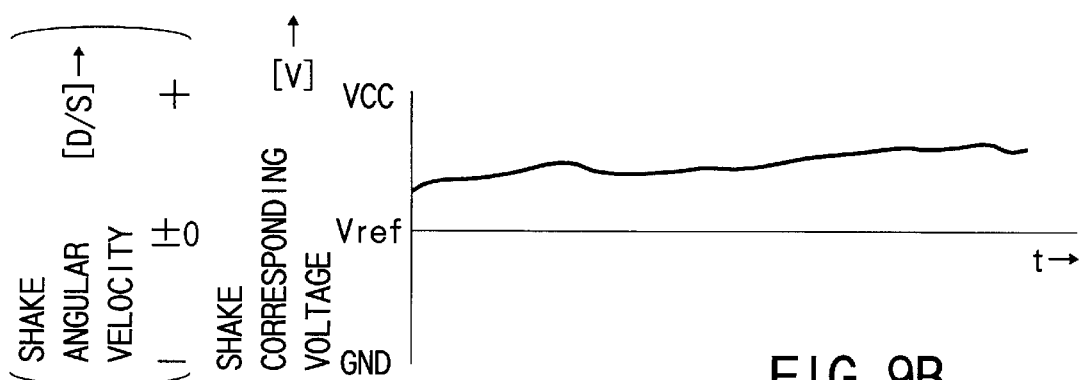
FIG. 9B is a graph showing a shake detection result (a waveform) obtained by photography executed with a slowly moving camera.
Figure 9C:
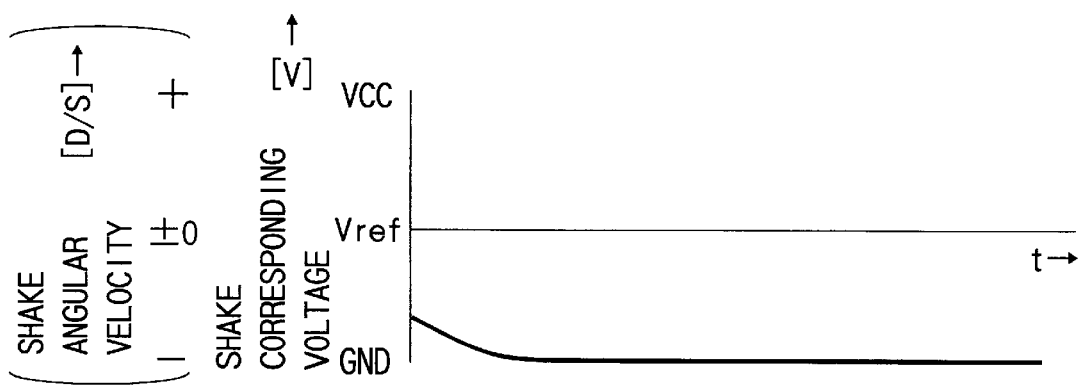
FIG. 9C is a graph showing a shake detection result (a waveform) obtained by photography executed with a quickly moving camera.

FIGS. 9A–9C show different shake detection results (waveforms) obtained from usual photography with a camera held by hand and obtained from photography with a moving camera. In FIGS. 9A–9C, the ordinate indicates the voltage [V] corresponding to the angular velocity [DEG/SEC] of shaking, Vref corresponding to a shake angular velocity of ±0. Further, the abscissa indicates time. More specifically, FIG. 9A shows an example of a waveform obtained from usual photography with a camera held by hand. FIGS. 9B and 9C show examples of waveforms obtained from photography with a moving camera.

As is understood from FIG. 9A, the shake angular velocity often crosses ±0 in the case of usual photography with a camera held by hand. On the other hand, in the case of photography with a moving camera, the shake angular velocity does not so often cross or never crosses ±0 as shown in FIGS. 9B and 9C, since the camera is being moved in a certain direction. FIG. 9B shows a waveform obtained when the camera is slowly moved, while FIG. 9C shows a waveform obtained when the camera is moved at a highest speed allowable in an analog processing system for shake detection.

Figure 10A:
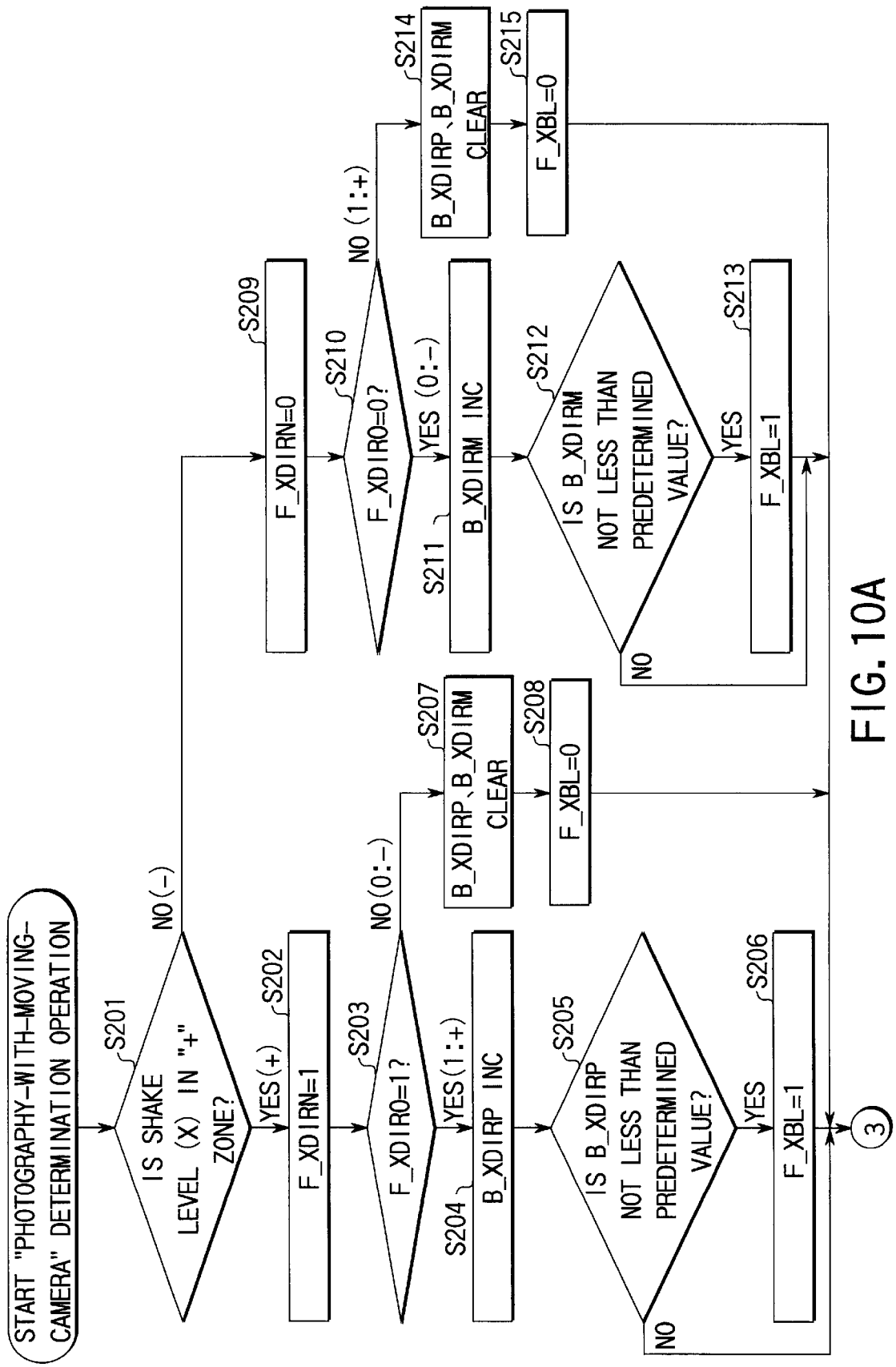
FIGS. 10A and 10B are a series of flowcharts useful in explaining the "photography-with-moving-camera" determination operation in FIG. 7B.
Figure 10B:
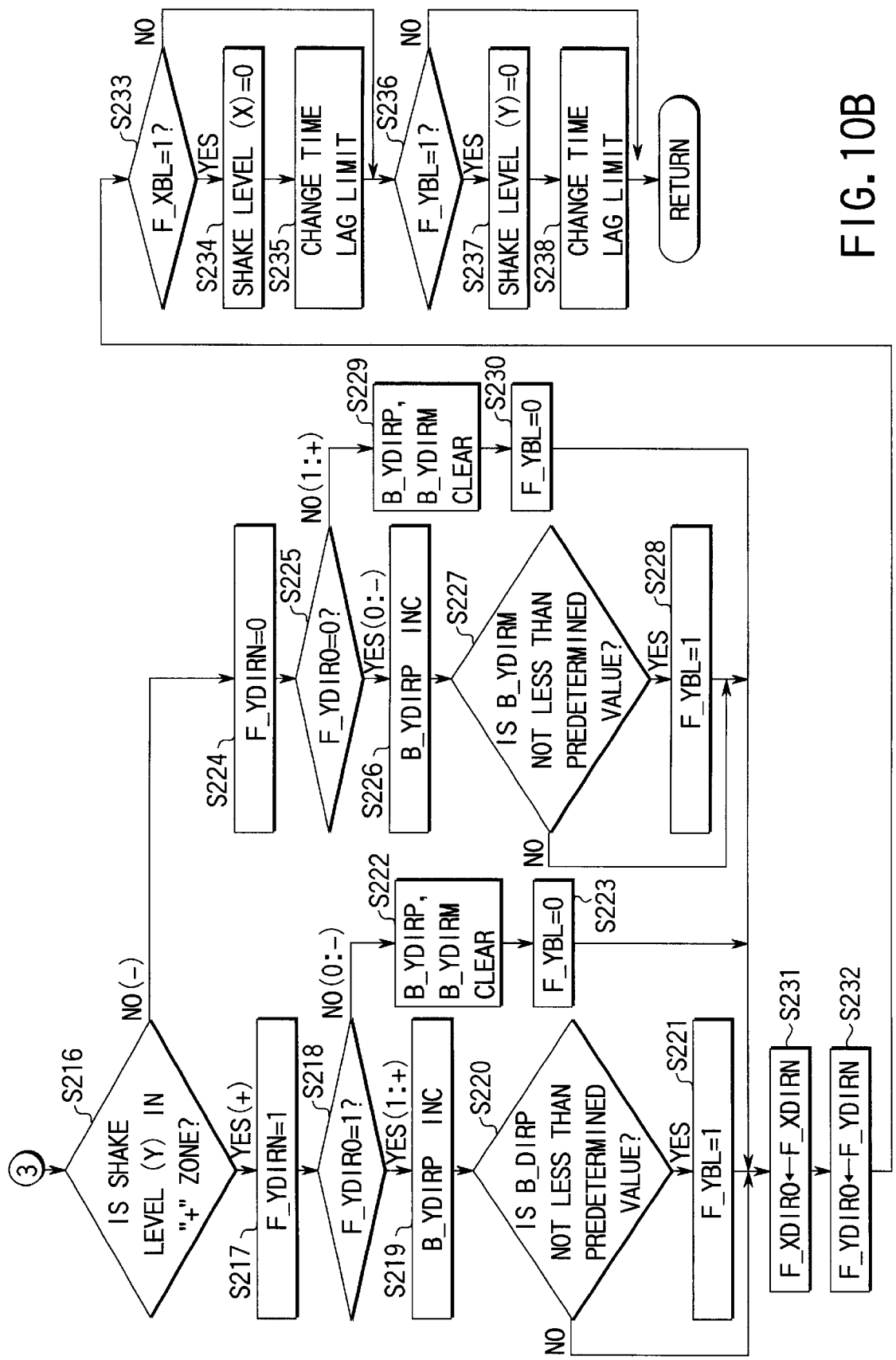

FIGS. 10A and 10B are a series of flowcharts useful in explaining a method employed at the step S116 for "photography-with-moving-camera" determination operation.

First, it is determined whether or not the present X-axis directional shake level (the output of the first shake computing section 15) has a "+" sign (step S201). In other words, it is determined whether or not the shake level is higher than the voltage Vref shown in FIGS. 9A–9C. If the level has the "+", the program proceeds to the next step S202, whereas if the level does not have the "+" sign, the program proceeds to a step S209.

If the present X-axis directional shake level has the "+" sign, a shake level (X) sign flag F_XDIRN indicating the sign of the present shake level (X) is set at "1" (step S202). At the next step S203, it is determined whether or not a shake level (X) sign flag F_XDIRO indicating the sign of a shake level (X) previously sampled is set at "1" (corresponding to the "+" sign). If the shake level (X) sign flag F_XDIRO is "1", the program proceeds to the next step S204 since the present shake level and the previous shake level both have the "+" sign. On the other hand, if the shake level (X) sign flag F_XDIRO is not "1", the program proceeds to a step S207 which will be described later, since this means that the shake angular velocity has crossed to ±0.

More specifically, if the shake level (X) sign flag F_XDIRO is "1", the value of a counter B_XDIRP for counting the number of shake levels (X) that exist in a "+" zone is incremented (step S204), thereby determining whether or not the incremented value of the counter B_XDIRP is not less than a predetermined value (step S205). If the value of the counter B_XDIRP is not equal to or not more than the predetermined value, the program immediately proceeds to a step S216 which will be described later. If, on the other hand, the value is not less than the predetermined value, it is determined that photography is being executed while moving the camera in the X-axis direction of the imaging surface, thereby setting, at "1", a flag F_XBL indicating photography executed while moving the camera in the X-axis direction (step S206), followed by the program proceeding to the step S216.

If it is determined at the step S203 that the shake level (X) sign flag F_XDIRO is not "1", i.e. if the shake angular velocity has crossed ±0, the counter B_XDIRP and a counter B_XDIRM for counting the number of shake levels (X) that exist in a "−" zone are cleared (step S207). After that, the flag F_XBL is set at "0" (step S208), and the program proceeds to the step S216.

On the other hand, if it is determined at the step S201 that the present X-axis directional shake level does not have the "+" sign, the shake level (X) sign flag F_XDIRN indicating the sign of the present shake level (X) is set at "0" (step S209). Then, it is determined whether or not the shake level (X) sign flag F_XDIRO indicating the sign of a shake level (X) previously sampled is "0" (corresponding to the "−" sign)(step S210). If the flag F_XDIRO is "0", the program proceeds to the next step S211, since the result means that the present shake level and the previous shake level have the same sign. If the flag is not "0", the program proceeds to a step S214 which will be described later, since the result means that the shake angular velocity has crossed ±0.

More specifically, if the shake level (X) sign flag F_XDIRO is "0", the value of the counter B_XDIRM for counting the number of shake levels (X) that exist in the "−" zone is incremented (step S211), thereby determining whether or not the incremented value of the counter B_XDIRM is not less than a predetermined value (step S212). If the value of the counter B_XDIRM is not equal to or not more than the predetermined value, the program immediately proceeds to a step S216 which will be described later. If, on the other hand, the value is not less than the predetermined value, it is determined that photography is being executed while moving the camera in the X-axis direction of the imaging surface, thereby setting, at "1", the flag F_XBL indicating photography executed while moving the camera in the X-axis direction (step S213), followed by the program proceeding to the step S216.

If it is determined at the step S210 that the shake level (X) sign flag F_XDIRO is not "0", i.e. if the shake angular velocity has crossed ±0, the counter B_XDIRP and the counter B_XDIRM are cleared (step S214). After that, the flag F_XBL is set at "0" (step S215), and the program proceeds to the step S216.

The processes at the steps S201–S215 are executed in the first "photography-with-moving-camera" state determining section 31 incorporated in the "photography-with-moving-camera" determining section 7.

The same processing as above will be executed in the Y-axis direction of the imaging surface.

First, it is determined whether or not the present Y-axis directional shake level (the output of the second shake computing section 16) has a "+" sign (step S216). In other words, it is determined whether or not the shake level is higher than the voltage Vref shown in FIGS. 9A–9C. If the level has the "+" sign, the program proceeds to the next step S217, whereas if the level does not have the "+" sign, the program proceeds to a step S224.

If the present Y-axis directional shake level has the "+" sign, a shake level (Y) sign flag F_YDIRN indicating the sign of the present shake level (Y) is set at "1" (step S217). At the next step S218, it is determined whether or not a shake level (Y) sign flag F_YDIRO indicating the sign of a shake level (Y) previously sampled is set at "1" (corresponding to the "1" sign). If the shake level (Y) sign flag F_XYIRO is "1", the program proceeds to the next step S219 since the present shake level and the previous shake level both have the "+" sign. On the other hand, if the shake level (Y) sign flag F_YDIRO is not "1", the program proceeds to a step S222 which will be described later, since this means that the shake angular velocity has crossed ±0.

More specifically, if the shake level (Y) sign flag F_YDIRO is "1", the value of a counter B_YDIRP for counting the number of shake levels (Y) that exist in the "+" zone is incremented (step S219), thereby determining whether or not the incremented value of the counter B_YDIRP is not less than a predetermined value (step S220). If the value of the counter B_YDIRP is not equal to or not more than the predetermined value, the program immediately proceeds to a step S231 which will be described later. If, on the other hand, the value is not less than the predetermined value, it is determined that photography is being executed while moving the camera in the Y-axis direction of the imaging surface, thereby setting, at "1", a flag F_YBL indicating photography executed while moving the camera in the Y-axis direction (step S221), followed by the program proceeding to the step S231 described later.

If it is determined at the step S218 that the shake level (Y) sign flag F_YDIRO is not "1", i.e. if the shake angular velocity has crossed "±", the counter B_YDIRP and a counter B_YDIRM for counting the number of shake levels (Y) that exist in a "−" zone are cleared (step S222). After that, the flag F_YBL is set at "0" (step S223), and the program proceeds to the step S231 described later.

On the other hand, if it is determined at the step S216 that the present Y-axis directional shake level does not have the "+" sign, the shake level (Y) sign flag F_YDIRN indicating the sign of the present shake level (Y) is set at "0" (step S224). Then, it is determined whether or not the shake level (Y) sign flag F_YDIRO indicating the sign of a shake level (Y) previously sampled is "0" (corresponding to the "−" sign)(step S225). If the flag F_YDIRO is "0", the program proceeds to the next step S226, since the result means that the present shake level and the previous shake level have the same sign. If the flag is not "10", the program proceeds to a step S229 which will be described later, since the result means that the shake angular velocity has crossed ±0.

More specifically, if the shake level (Y) sign flag F_YDIRO is "0", the value of the counter B_YDIRM for counting the number of shake levels (Y) that exist in the "−" zone is incremented (step S226), thereby determining whether or not the incremented value of the counter B_YDIRM is not less than a predetermined value (step S227). If the value of the counter B_YDIRM is not equal to or not more than the predetermined value, the program immediately proceeds to the step S231 described later. If, on the other hand, the value is not less than the predetermined value, it is determined that photography is being executed while moving the camera in the Y-axis direction of the imaging surface, thereby setting, at "1", the flag F_YBL indicating photography executed while moving the camera in the Y-axis direction (step S228), followed by the program proceeding to the step S231.

If it is determined at the step S225 that the shake level (Y) sign flag F_YDIRO is not "0", i.e. if the shake angular velocity has crossed ±0, the counter B_YDIRP and the counter B_YDIRM are cleared (step S229). After that, the flag F_YBL is set at "0" (step S230), and the program proceeds to the step S231 described later.

The processes at the steps S216–S230 are executed in the second "photography-with-moving-camera" state determining section 32 incorporated in the "photography-with-moving-camera" determining section 7.

After the X-axis directional and Y-axis directional processing is finished, the value of the shake level (X) sign flag F_XDIRN indicating the sign of the present shake level (X) is written into the shake level (X) sign flag F_XDIRO indicating the sign of a shake level (X) previously sampled (step S231). Similarly, the value of the shake level (Y) sign flag F_YDIRN indicating the sign of the present shake level (Y) is written into the shake level (Y) sign flag F_YDIRO indicating the sign of a shake level (Y) previously sampled (step S232).

Subsequently, it is determined whether or not the flag F_XBL indicating photography executed while moving the camera in the X-axis direction is "1" (step S233). If the flag F_XBL is "0", the program proceeds to a step S236, which will be described later. If, on the other hand, the flag F_XBL is "1", i.e. if photography is now being executed while moving the camera in the X-axis direction, it is determined that the present shake level (X) and an estimated shake level (X) should be treated as a predetermined level (zero level) irrespective of the outputs of the first shake computing section 15 and the first shake estimating/computing section 43 (step S234). In light of the fact that photography is now being executed while moving the camera, the time lag limit set in the time lag limit setting section 25 is changed to a lower value (step S235).

After that, or if it is determined at the step S233 that the flag F_XBL indicating photography executed while moving the camera in the X-axis direction is "0", it is determined whether or not the flag F_YBL indicating photography executed while moving the camera in the Y-axis direction is "1" (step S236). If the flag F_YBL is "0", the program returns to the upper routine. On the other hand, if the flag F_YBL is "1", i.e. if photography is now being executed while moving the camera in the Y-axis direction, it is determined that the present shake level (Y) and an estimated shake level (Y) should be treated as a predetermined level (zero level) irrespective of the outputs of the second shake computing section 16 and the second shake estimating/computing section 44 (step S237). In light of the fact that photography is now being executed while moving the camera, the time lag limit set in the time lag limit setting section 25 is changed to a lower value (step S238), followed by the program returning to the upper routine.

The processes at the steps S233–S238 are executed by the exposure start determination controlling section 5. By virtue of this structure, during execution of photography while moving the camera, exposure start determination is substantially executed only on the X-axis or Y-axis directional shake level and estimated shake level, which do not relate to the movement of the camera. As a result, a time lag which will occur during photography can be minimized.

A detailed description will be given of the "exposure start determination operation B" executed at the step S124.

Referring first to the flowchart of FIG. 11, a first example of the determination operation B will be described.

First, it is determined, on the basis of the output of the first shake estimating/computing section 43, whether or not the shake level (X) has crossed the zero level (step S301). This determination is made to determine whether or not the shake angular velocity has become ±0 in FIG. 12. If the shake level (X) is not equal to or does not cross the zero level, the program proceeds to a step S305, which will be described later.

If, on the other hand, the shake level (X) has crossed the zero level, an X-directional shake level flag F_XFLAG is set at "1" (step S302). Then, it is determined whether or not a Y-directional shake level flag F_YFLAG is set at "0" (step S303). This determination is made to determine whether or not the estimated shake level (Y) has crossed the zero level (within an exposure start determination period described later). If the flag F_YFLAG is not "0", i.e. if the F_YFLAG is "1" and indicates that the estimated shake level (Y) has crossed the zero level, the program proceeds to a step S314, which will be described later. If the flag F_YFLAG is "0", i.e. if the estimated shake level (Y) dose not cross the zero level, a timer for exposure start determination is reset and started (step S304).

After that, or if it is determined at the step S301 that the shake level (X) is not equal to or does not cross the zero level, it is determined, on the basis of the output of the second shake estimating/computing section 44, whether or not the estimated shake level (Y) has crossed the zero level (step S305). This determination is made to determine whether or not the shake angular velocity has become ±0 in FIG. 12. If the estimated shake level (Y) is not equal to or does not cross the zero level, the program proceeds to a step S309, which will be described later.

If, on the other hand, the estimated shake level (Y) has crossed the zero level, the Y-directional shake level flag F_YFLAG is set at "1" (step S306). Then, it is determined whether or not the X-directional shake level flag F_XFLAG is set at "0" (step S307). This determination is made to determine whether or not the estimated shake level (X) has crossed the zero level (within an exposure start determination period described later). If the flag F_XFLAG is not "0", i.e. if the F_XFLAG is "1" and indicates that the estimated shake level (X) has crossed the zero level, the program proceeds to the step S314 described later. If the flag F_XFLAG is "0", i.e. if the estimated shake level (X) does not cross the zero level, the timer for exposure start determination is reset and started (step S308).

After that, or if it is determined at the step S305 that the shake level (Y) is not equal to or does not cross the zero level, exposure start determination period information is read from the exposure start determination period setting section 22 (step S309). At the next step S310, it is determined whether or not the timer having started at the step S304 or S308 has counted a period not less than the read exposure start determination period. This determination is made to determine whether or not both the estimated shake levels (X) and (Y) have crossed the zero level within the read exposure start determination period. If the period counted by the timer has not yet reached the read exposure start determination period, the program returns to the upper routine.

On the other hand, if it is determined that the period counted by the timer has reached the read exposure start determination period, it is further determined that the level of shaking is high, thereby setting the X-directional shake level flag F_XFLAG at "0" (step S311), and also setting the Y-directional shake level flag F_YFLAG at "0" (step S312). These flag values imply that none of the X-directional and Y-directional shake levels has crossed the zero level. Then, the timer having started at the step S304 or S308 is stopped (step S313), and the program returns to the upper routine. This means that the level of shaking is not so low, or that exposure start determination, which will be described later, has been finished.

If it is determined at the steps S303 and S307 that the Y-directional shake level flag F_YFLAG or the X-directional shake level flag F_XFLAG is "1", then it is determined that exposure should be started, since the determination results indicate that the X-directional and Y-directional estimated shake levels have crossed the zero level within the exposure start determination period. Therefore, in this case, the leading-curtain-drive-start allowing flag F_GOFLAG is set at "1" (step S314). As a result, the start of exposure is allowed at the aforementioned step S125. Thereafter, the program proceeds to the step S313 to thereby stop the timer, and then returns to the upper routine.

Figure 12:
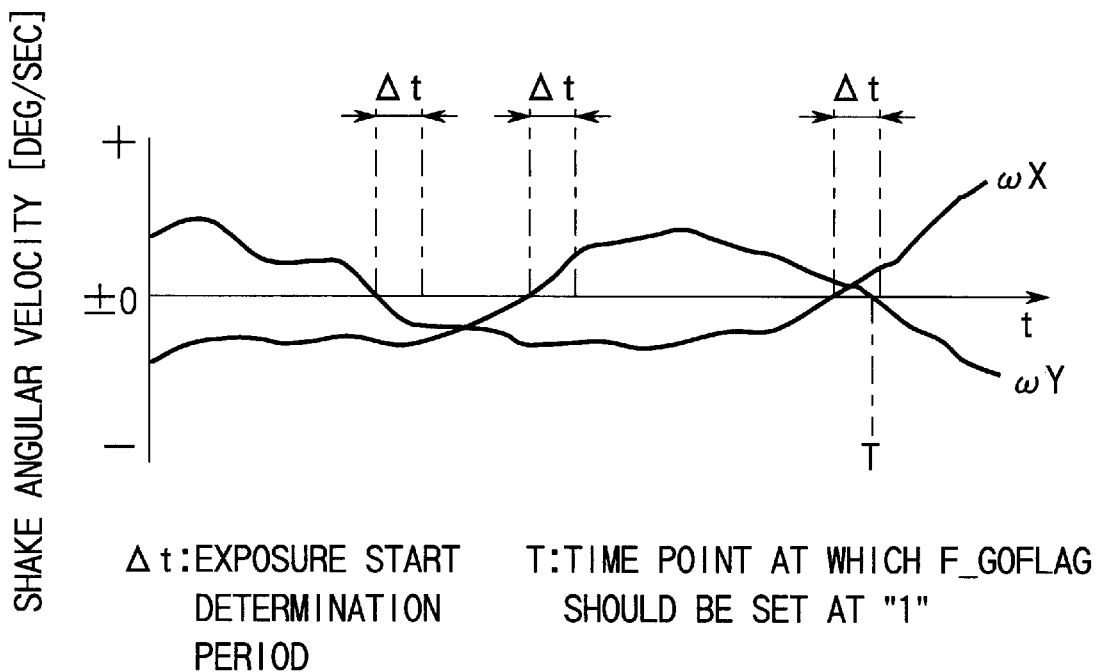
FIG. 12 is a graph illustrating the relationship between the time and the x- and Y-directional shake angular velocities, and useful in explaining the exposure start determination operation B in FIG. 11.

In FIG. 12, at a time point T, the leading-curtain-drive-start allowing flag F_GOFLAG should be set at "1". Further, "Δt" indicates the exposure start determination period.

Referring now to the flowchart of FIG. 13, a second example of the "exposure start determination operation B" executed at the step S124 will be described.

First, the exposure start determination level information set in the exposure start determination level setting section 23 is read (step S321). This information corresponds to shake angular velocities "TH+" and "TH−" in FIG. 14 and indicates shake allowable limit values. The center value ±0 between "TH+" and "TH−" corresponds to the zero level of the shake angular velocity.

On the basis of the output of the first shake estimating/computing section 43, it is determined at a step S322 whether or not the estimated shake level (X) falls within the range of "TH+"−"TH−". If the level (X) falls within the range, the X-directional shake level flag F__XFLAG is set at "1" (step S323), whereas if the level (X) does not fall within the range, the flag F__XFLAG is set at "0" (step S324).

Subsequently, on the basis of the output of the second shake estimating/computing section 44, it is determined at a step S325 whether or not the estimated shake level (Y) falls within the range of "TH+"−"TH−". If the level (Y) falls within the range, the Y-directional shake level flag F__YFLAG is set at "1" (step S326), whereas if the level (Y) does not fall within the range, the flag F__YFLAG is set at "0" (step S327).

After that, it is determined whether or not both the X-directional shake level flag F__XFLAG and the Y-directional shake level flag F__YFLAG are set at "1" (step S328). In other words, it is determined whether or not both the estimated shake levels (X) and (Y) fall within the allowable range of "TH+"−"TH−". If at least one of the levels (X) and (Y) falls within the allowable range, the program returns to the upper routine, whereas if both the levels (X) and (Y) fall within the allowable range, the leading-curtain-drive-start allowing flag F__GOFLAG is set at "1" (step S329). As a result, the start of exposure is allowed at the aforementioned step S125. Thereafter, the program returns to the upper routine.

Figure 14:
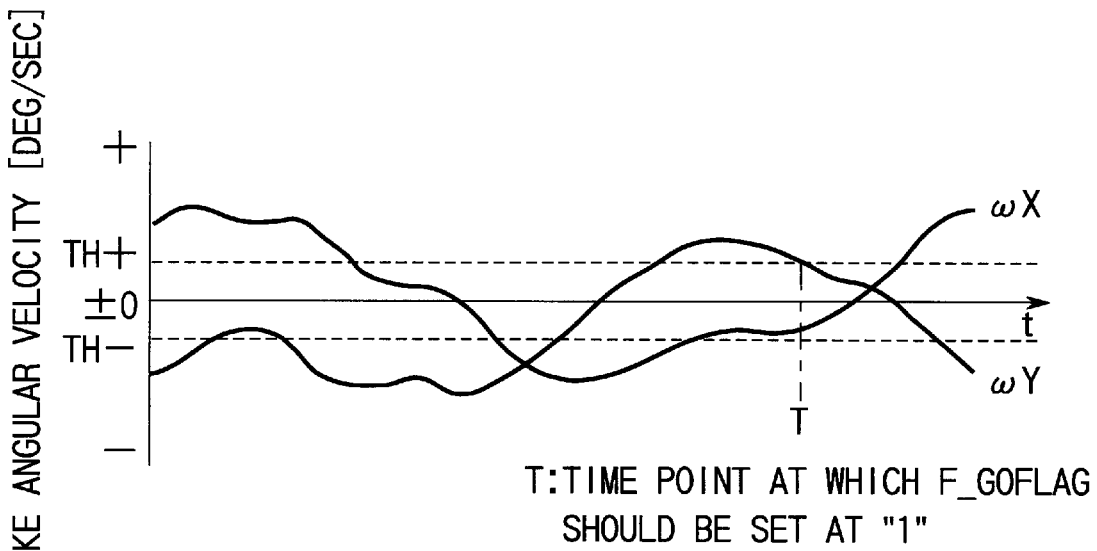
FIG. 14 is a graph illustrating the relationship between the time and the X- and Y-directional shake angular velocities, and useful in explaining the exposure start determination operation B in FIG. 13.

In FIG. 14, at a time point T, the leading-curtain-drive-start allowing flag F__GOFLAG should be set at "1".

A detailed description will be given of the "exposure start determination operation A" executed at the step S121.

Referring to the flowchart of FIG. 15, a first example of the determination operation A will be described. Since FIG. 15 includes the same processes as those employed in FIG. 11 relating to the determination operation B, only different processes will be described below.

Figure 11:
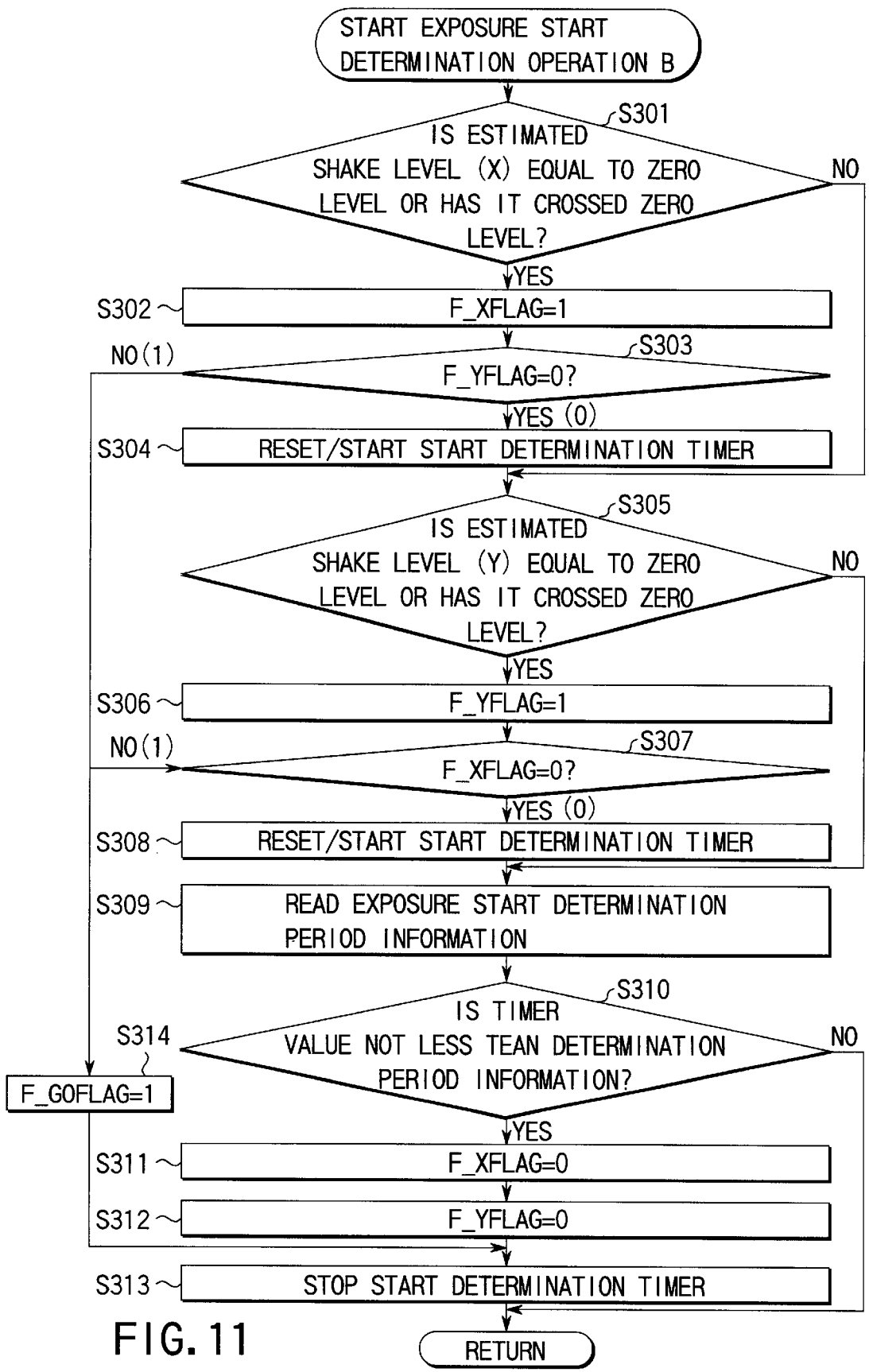
FIG. 11 is a flowchart useful in explaining an example of the exposure start determination operation B in FIG. 7B.

At the step S301 or S305 in FIG. 11, determination is executed on the basis of the estimated shake level (X) or (Y). On the other hand, at a corresponding step S401 or S405 in FIG. 15, determination is executed on the basis of the present shake level (X) or (Y), i.e. the output of the first or second shake computing section 15 or 16.

Figure 15:
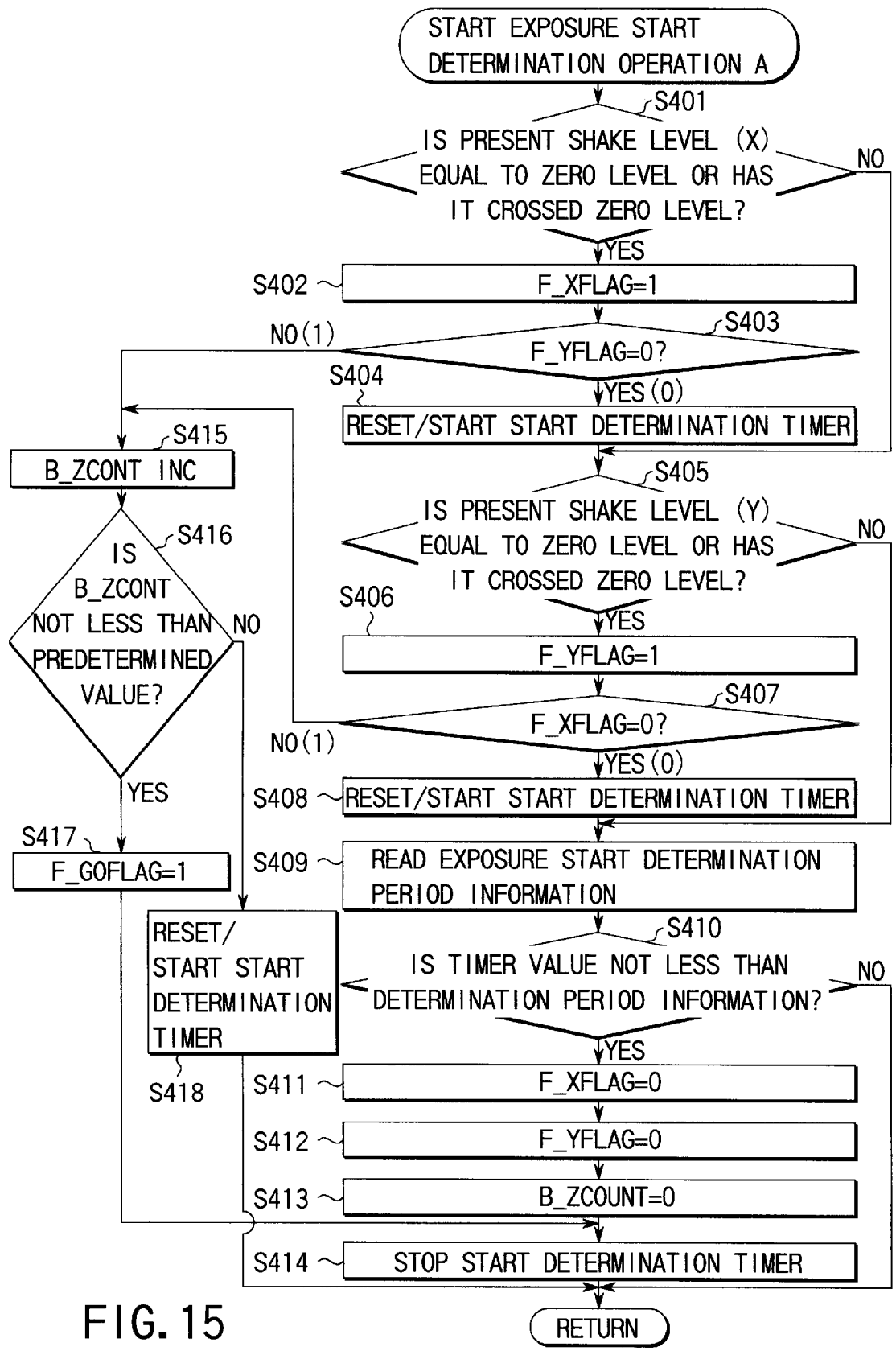
FIG. 15 is a flowchart useful in explaining an example of the exposure start determination operation A in FIG. 7B.

The case of FIG. 15 also differs from the case of FIG. 11 in processing executed, at a step S403 or S407 corresponding to the step S303 or S307, when the X-directional shake level flag F__XFLAG or the Y-directional shake level flag F__YFLAG is determined to be "1". This processing will now be described.

If it is determined that the X-directional shake level flag F__XFLAG or the Y-directional shake level flag F__YFLAG is "1", at first, the value of a continuous shake state counter B__ZCOUNT is incremented (step S415). Then, it is determined whether or not the value of the counter B__ZCOUNT is not less than a predetermined value (step S416). If the value is not less than the predetermined value, the leading-curtain-drive-start allowing flag F__GOFLAG is set at "1" (step S417), followed by the program proceeding to a step S414 (corresponding to the step S313 in FIG. 11). If it is determined that the value is lower than the predetermined value, a timer for exposure start determination is reset and started at a step S418 in the same manner as at the step S304 or S308 in FIG. 11, followed by the program returning to the upper routine.

After the same determination as at the step S310 is executed at a step S410, the same processes as at the steps S311 and S312 are executed at corresponding steps S411 and S412, and then processing for clearing the contents of the continuous shake state counter B__ZCOUNT is additionally executed at a step S413. The reason why this processing is done is that a rather long time has elapsed after the shake level has crossed the zero level.

The above processing employed in FIG. 15 (relating to the exposure start determination operation A) is characterized in that the start of exposure is allowed when the present shake levels (X) and (Y) have crossed the zero level a plurality of times within the exposure start determination period. This differs from the case of FIG. 11 (relating to the exposure start determination operation B) in which the start of exposure is allowed when both the estimated shake levels (X) and (Y) have crossed the zero level within the exposure start determination period. The structure of FIG. 15 enables execution of exposure start determination even if the number of shake levels to be stored for shake estimation does not reach a predetermined value (corresponding to a predetermined period). Although in this case, it is desirable that determination should be executed on the basis of an estimation result. However, this cannot actually be realized, and hence determination is executed under more strict conditions than usual (i.e. than the determination operation B).

Figure 16:
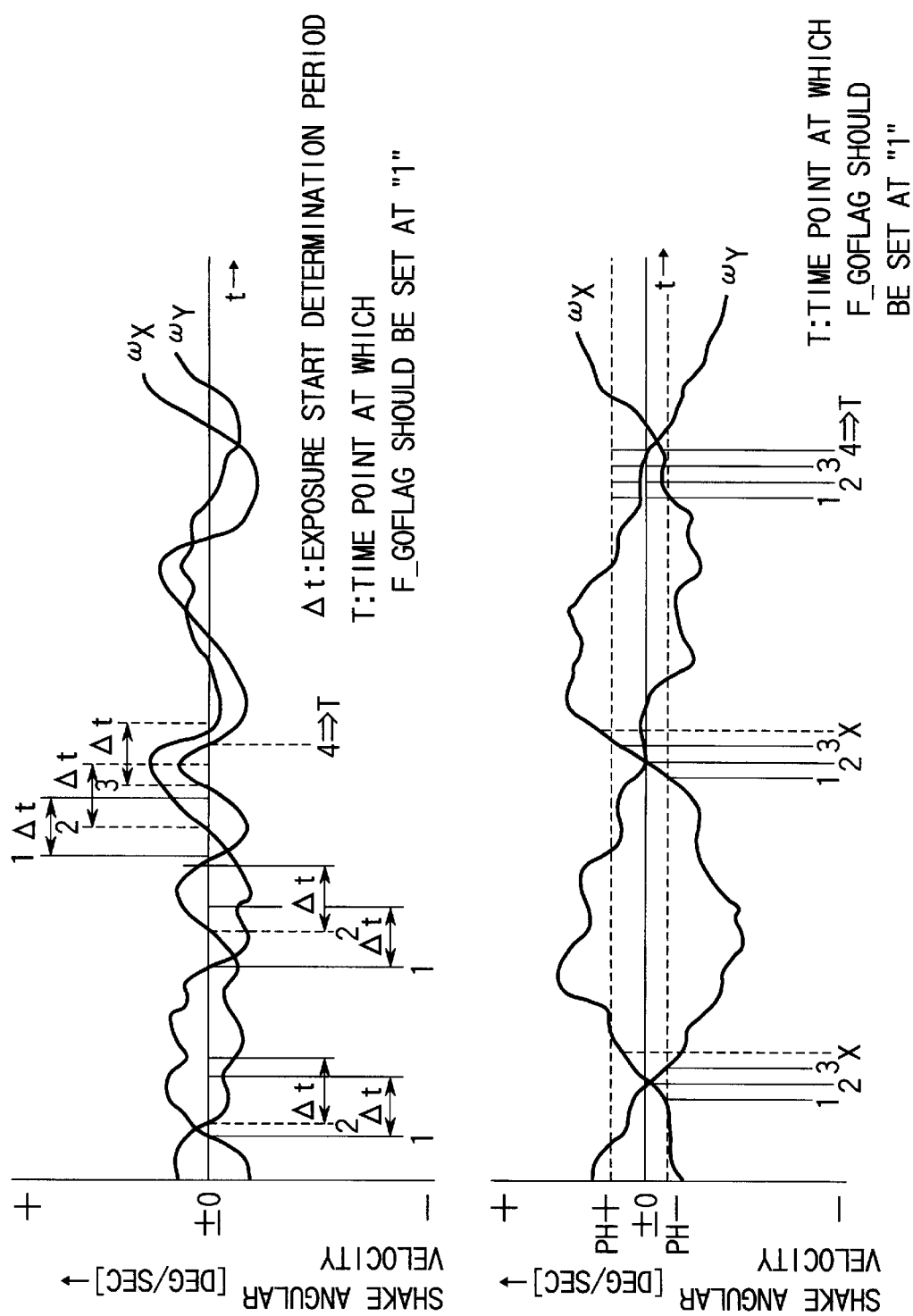
FIG. 16 is a graph illustrating the relationship between the time and the X- and Y-directional shake angular velocities, and useful in explaining the exposure start determination operation A in FIG. 15.

In FIG. 16, at a time point T, the leading-curtain-drive-start allowing flag F__GOFLAG should be set at "1". Further, "Δt" indicates the exposure start determination period. In other words, the start of exposure is allowed when the shake levels have crossed the zero level a predetermined number of times within the exposure start determination period.

Although in this embodiment, the predetermined value at the step S416 is "4", another value may be employed. Further, the structure of FIG. 15 may be modified such that the start of exposure is allowed when the shake level (X) has crossed the zero level a predetermined number of times within the exposure start determination period and the shake level (Y) has crossed the zero level a predetermined number of times within the exposure start determination period.

Referring then to the flowchart of FIG. 17, a second example of the determination operation A executed at the step S121 will be described. Since FIG. 17 includes the same processes as those employed in FIG. 13 relating to the determination operation B, only different processes will be described below.

Figure 13:
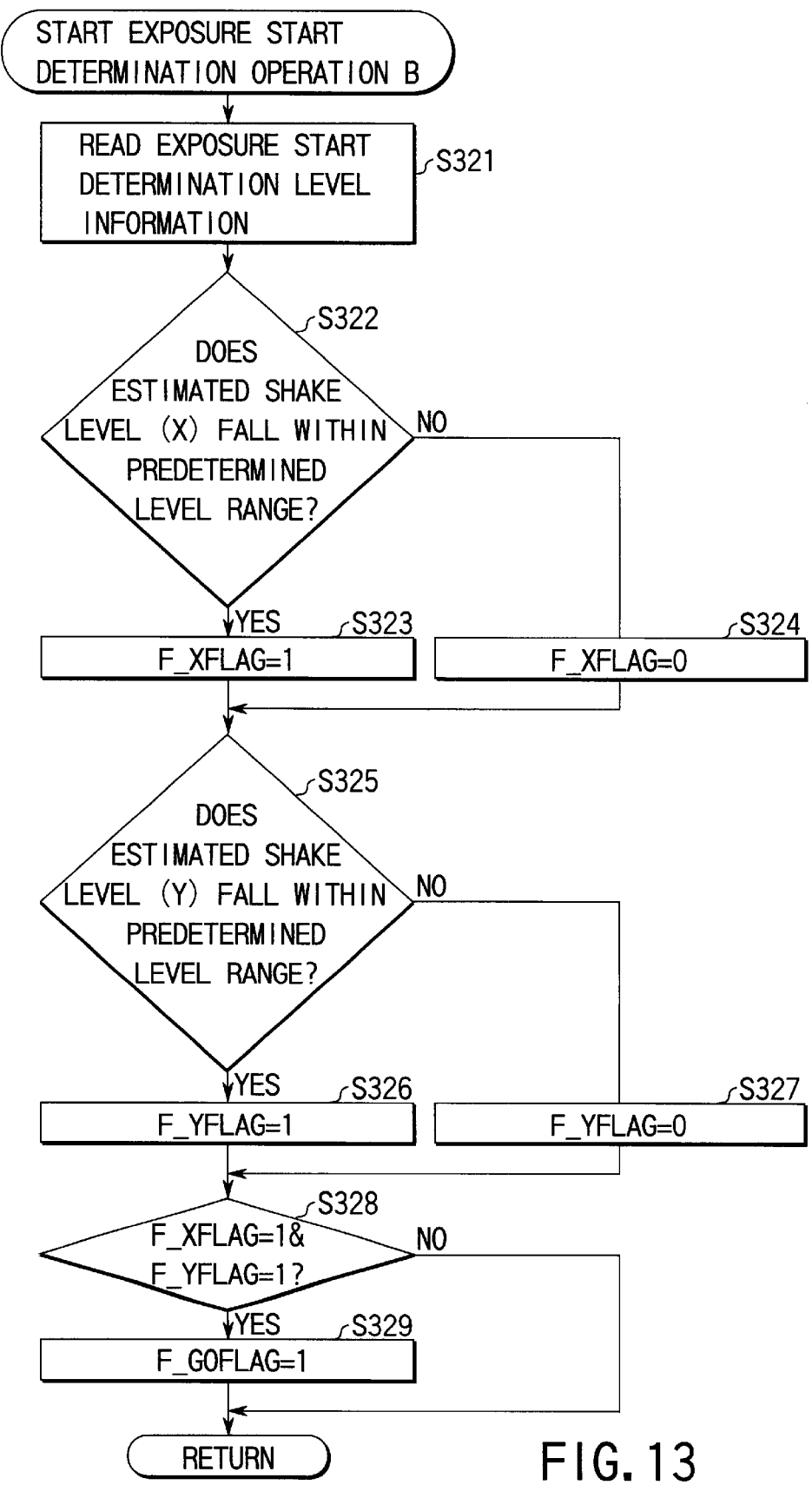
FIG. 13 is a flowchart useful in explaining another example of the exposure start determination operation B in FIG. 7B.

At the step S322 or S325 in FIG. 13, determination is executed on the basis of the estimated shake level (X) or (Y). On the other hand, at a corresponding step S422 or S425 in FIG. 17, determination is executed on the basis of the present shake level (X) or (Y), i.e. the output of the first or second shake computing section 15 or 16.

At a step S428 corresponding to the step S328, different processes are executed between a case where both the X-directional shake level flag F__XFLAG and the Y-directional shake level flag F__YFLAG are "1", and a case where at least one of the flags is not "1". This processing will now be described.

If it is determined that both the X-directional shake level flag F__XFLAG and the Y-directional shake level flag F_YFLAG are "1", at first, the value of the continuous shake state counter B_ZCOUNT is incremented (step S429). Then, it is determined whether or not the value of the counter B_ZCOUNT is not less than a predetermined value (step S430). If the value is not less than the predetermined value, the leading-curtain-drive-start allowing flag F_GOFLAG is set at "1" (step S431), followed by the program returning to the upper routine. If the value is lower than the predetermined value, the program directly returns to the upper routine.

On the other hand, if it is determined at the step S428 that at least one of the X-directional shake level flag F_XFLAG and the Y-directional shake level flag F_YFLAG is not "1", the counter B_ZCOUNT is cleared (step S432). This is because a rather long time has elapsed after the shake level has crossed the zero level. After that, the program returns to the upper routine.

Figure 17:
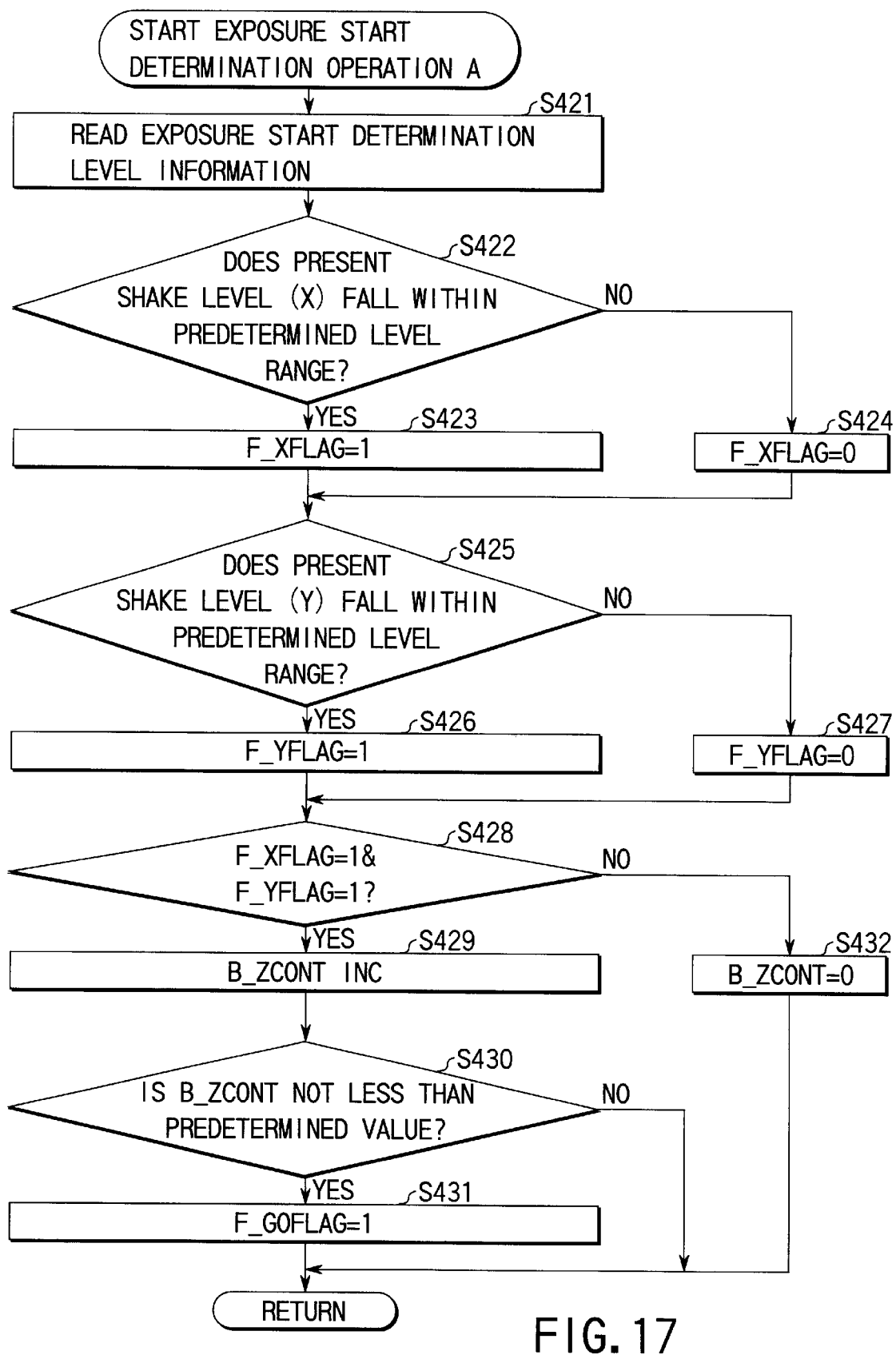
FIG. 17 is a flowchart useful in explaining another example of the exposure start determination operation A in FIG. 7B.

The above processing employed in FIG. 17 (relating to the exposure start determination operation A) is characterized in that the start of exposure is allowed when both the present shake levels (X) and (Y) continuously fall within a certain exposure start determination level range a plurality of times. This differs from the case of FIG. 13 (relating to the exposure start determination operation B) in which the start of exposure is allowed when both the estimated shake levels (X) and (Y) fall within the exposure start determination level range. The structure of FIG. 17 enables execution of exposure start determination even if the number of shake levels to be stored for shake estimation does not reach a predetermined value (corresponding to a predetermined period). Although in this case, it is desirable that determination should be executed on the basis of an estimation result. However, this cannot actually be realized, and hence determination is executed under more strict conditions than usual (i.e. than the determination operation B).

In FIG. 18, at a time point T, the leading-curtain-drive-start allowing flag F_GOFLAG should be set at "1". In other words, the start of exposure is allowed when both the shake levels (X) and (Y) continuously fall within a certain exposure start determination level range a predetermined number of times.

Although in this embodiment, the predetermined value at the step S416 is "4", another value may be employed.

Figure 19:
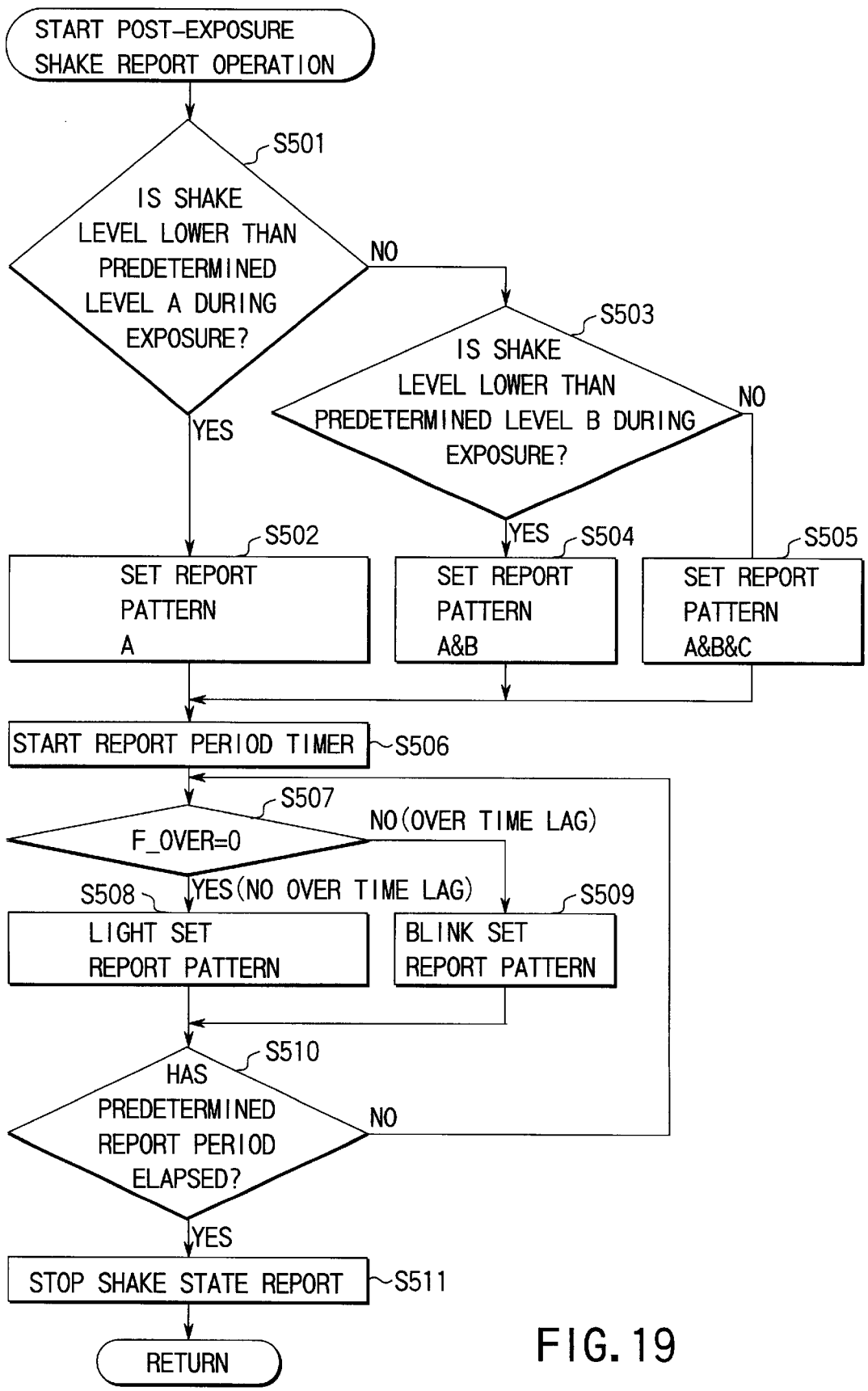
FIG. 19 is a flowchart useful in explaining the post-exposure shake report operation in FIG. 7C.

Referring now to the flowchart of FIG. 19, a method for executing "post-exposure shake report" operation at the aforementioned step S152 will be described.

First, it is determined whether or not the shake level during exposure is lower than a predetermined level A (step S501). If it is lower than the predetermined level A, a report pattern A is set (step S502), followed by the program proceeding to a step S506.

If, on the other hand, the shake level during exposure is not lower than the predetermined level A, it is then determined at a step S503 whether or not the shake level during exposure is lower than a predetermined level B. If it is lower than the predetermined level B, a report pattern B is set at a step S504, followed by the program proceeding to a step S506, which will be described later. On the other hand, if the shake level during exposure is not lower than the predetermined level B, a report pattern C is set at a step S505, followed by the program proceeding to the step S506 described later.

There are report patterns as shown in, for example, FIG. 6. In this case, the report pattern A corresponds to a pattern indicated by (a) of FIG. 6, the report pattern B to a pattern indicated by (b) of FIG. 6, and the report pattern C to a pattern indicated by (c) of FIG. 6.

The shake level used at the step S501 or S503 corresponds to the final shake level obtained at the aforementioned step S146. Further, the predetermined levels A and B correspond to, for example, 50 μm and 100 μm on a 35 mm film, respectively. It is sufficient if it can be discriminated, from the report patterns, whether blurring in an image resulting from shaking is at as low a level as can be ignored by the photographer, or at a level as to be slightly worrying, or at as high a level as to be significantly worrying.

After the report pattern is set, a timer for executing a post-exposure shake report for a predetermined period is started at a step S506. After this, it is determined whether or not the time lag limit over flag F_OVER is set at "0" (step S507).

If the time lag limit over flag F_OVER is set at "0", this means that there is no over time lag, i.e. that exposure has been started after shaking has been reduced, and therefore the state reporting section 66 is lit in the form of the report pattern set at the step S502, S504 or S505 (step S508).

On the other hand, if the time lag limit over flag F_OVER is set at "1", this means that there is an over time lag, i.e. that exposure has been started so the photographer will not misunderstand that the camera is out of order, although shaking has not yet been reduced. In this case, the state reporting section 66 is blinked in the form of the report pattern set at the step S502, S504 or S505 (step S509). This blinking informs the photographer that exposure has been started after a time lag limit (i.e. exposure has been executed with a high level of shaking), which means that photography has been executed at a time point different from the photographer's target time point and therefore that it is highly possible that blurring occurs in a photograph.

After starting the lighting or blinking of the state reporting section, it is determined at a step S510 whether or not the report period timer having started at the step S506 has counted a predetermined period. If it is determined that the predetermined period has not yet elapsed, the program returns to the step S507. The predetermined period is, for example, 300 mSEC.

After the predetermined period elapses, the post-exposure shake report by the state reporting section 66 is turned off (step S511), followed by the program returning to the upper routine.

Although the present invention has been described with reference to an embodiment thereof, it is not limited to the embodiment, but may be modified in various manners without departing from its scope.

For example, in the above embodiment, one of two exposure start determining methods is selectively used for exposure start determination, on the basis of the value of the counter B_COUNTA for counting the number of data items accumulated for shake estimation and computation. However, instead of the two exposure start determining methods, three or more exposure start determining methods may be used. Further, the exposure start determining method may be selected on the basis of, for example, a predetermined time point as well as the value of the counter B_COUNTA.

Moreover, although the embodiment relates to a single-lens reflex camera, the invention is not limited to this type of camera.

In addition, the invention is also applicable to a so-called digital camera, which picks up an image of a to-be-photographed object using an imaging element and stores the image in a storage medium.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A camera with a blur reducing function comprising:

sampling means responsive to a releasing operation for sampling levels of shaking of the camera in a time-series manner;

control means for starting exposure when shake data sampled by said sampling means satisfies a predetermined determination criterion or when a period having elapsed from the releasing operation has reached a predetermined period; and display means for displaying information concerning conditions assumed at least till start of exposure.

2. The camera according to claim 1, wherein said display means displays information corresponding to stages of a period which has elapsed from the releasing operation to the start of exposure.

3. The camera according to claim 1, wherein said display means displays, after exposure, information concerning a level of shaking during exposure when said control means starts exposure the predetermined period after the releasing operation.

4. The camera according to claim 1, wherein when said control means starts exposure the predetermined period after the releasing operation, said display means displays, after exposure, information indicating that exposure was started the predetermined period after the releasing operation.

5. A camera with a blur reducing function comprising:

a shake detecting/computing section for detecting and computing a shaking state of the camera;

a photography start determining section for executing photography start determination on the basis of an output of said shake detecting/computing section so as to reduce shaking during photography;

a shutter unit operable in response to a determination result of said photography start determining section, thereby enabling photography;

a time measuring section for measuring a period for which the photography start determination is continued by said photography start determining section; and a reporting section for reporting time lag information in stages on the basis of a measurement result of said time measuring section.

6. The camera according to claim 5, further comprising:

a photography start determination control section responsive to the measurement result of said time measuring section for controlling the photography start determination of said photography start determining section, and wherein said photography start determination control section changes a photography start determination method employed in said photography start determining section, in response to the measurement result of said time measuring section.

7. The camera according to claim 5, further comprising:

a photography start determination control section responsive to the measurement result of said time measuring section for controlling the photography start determination of said photography start determining section; and a time lag limit setting section for setting information concerning an effective time limit on the photography start determination by said photography start determining section, and wherein said photography start determination control section outputs to said photography start determining section an instruction to allow start of photography irrespective of an output of said shake detecting/computing section, when the effective time limit set by said time lag limit setting section has expired, and said reporting section reports, after a photography operation is executed by said shutter unit, that the photography operation has been executed irrespective of the output of said shake detecting/computing section.

8. The camera according to claim 7, wherein said reporting section also reports information concerning shaking during photography.

9. The camera according to claim 5, wherein said reporting section is a display section.

10. A camera comprising:

a sensor for continuously sensing a shake state of the camera;

a release switch for instructing the camera to execute a photography operation;

a shutter unit;

a control circuit for operating said shutter unit so as to execute photography when said release switch has been depressed and after an output of said sensor is lower than a predetermined value; and a monitor for displaying information indicating stages of a wait period for which said control circuit was waiting for the output of said sensor to become lower than the predetermined value.

11. The camera according to claim 10, wherein said control circuit executes forced photography by forcibly operating said shutter unit when the wait period has reached a predetermined value, and said monitor displays information on the forced photography after the forced photography.

12. The camera according to claim 10, wherein said monitor displays information corresponding to a shake level sensed by said sensor during photography.

13. A method of reducing, during exposure, shaking of a camera having a sensor for sensing a shake state of the camera, and a monitor for displaying information on shaking, comprising:

a first step of sampling shake data in a time-series manner on the basis of an output of the sensor;

a second step of measuring a period required for a level of shaking to be lower than a reference value, on the basis of a predetermined number of shake data items sampled by the sensor in a time-series manner;

a third step of displaying, on the monitor, information corresponding to the period;

a fourth step of forcibly executing exposure when the period is longer than a predetermined value; and a fifth step of displaying on the monitor, after exposure is executed forcibly, information indicating the execution of forced exposure.

* * * * *